(12) United States Patent
Anderson

(10) Patent No.: US 12,540,430 B2
(45) Date of Patent: Feb. 3, 2026

(54) VARIOUS ATTACHMENTS FOR ADDITIVE TEXTILE MANUFACTURING MACHINES

(71) Applicant: Arachne Labs LLC, Carlisle, PA (US)

(72) Inventor: Christopher Anderson, Tukwila, WA (US)

(73) Assignee: Arachne Labs LLC, Carlisle, PA (US)

( * ) Notice: Subject to any disclaimer, the term of this patent is extended or adjusted under 35 U.S.C. 154(b) by 108 days.

(21) Appl. No.: 18/070,803

(22) Filed: Nov. 29, 2022

(65) Prior Publication Data

US 2023/0220598 A1 Jul. 13, 2023

Related U.S. Application Data

(60) Provisional application No. 63/298,309, filed on Jan. 11, 2022.

(51) Int. Cl.
   *D05C 13/00* (2006.01)
   *B29C 64/118* (2017.01)
   (Continued)

(52) U.S. Cl.
   CPC ............ *D05C 13/00* (2013.01); *B29C 64/118* (2017.08); *B29C 64/245* (2017.08); *B33Y 10/00* (2014.12); *B33Y 30/00* (2014.12); *D06B 11/0059* (2013.01); *D06H 7/00* (2013.01); *D06M 10/02* (2013.01); *D06P 5/00* (2013.01);
   (Continued)

(58) Field of Classification Search
   CPC ..... D05C 13/00; B29C 64/118; B29C 64/245; B33Y 10/00; B33Y 30/00; B33Y 80/00; D06B 11/0059; D06B 1/02; D06H 7/00; D06H 3/08; D06M 10/02; D06P 5/00; G06T 7/0004; G06T 2207/30124;
   (Continued)

(56) References Cited

U.S. PATENT DOCUMENTS 4,594,955 A * 6/1986 Lichtenberg ...... B29C 66/81422
                                                  83/435
5,755,168 A    5/1998 Gunther et al.
(Continued)

FOREIGN PATENT DOCUMENTS

CN    104630999 A * 5/2015 ............ D05C 13/00
CN    108568965 A * 9/2018 ........... B29C 64/112
(Continued)

OTHER PUBLICATIONS

WellerTools, "Weller WTBR1000 Benchtop Solder Robot", https://www.youtube.com/watch?v=HSbTiOeY88Q, Aug. 17, 2018. 1 page.
(Continued)

*Primary Examiner* — Dah-Wei D. Yuan
*Assistant Examiner* — Nga Leung V Law
(74) *Attorney, Agent, or Firm* — Edell, Shapiro & Finnan LLC

(57) ABSTRACT

Various attachments for additive textile manufacturing machines are disclosed. In one example, an apparatus is provided which comprises a connector component and a liquid deposition component. The connector component is configured to attach to an additive textile manufacturing machine that produces a textile product. The liquid deposition component is configured to deposit a liquid on one or more materials of the textile product.

20 Claims, 20 Drawing Sheets

(51) Int. Cl.
| | |
|---|---|
| B29C 64/245 | (2017.01) |
| B33Y 10/00 | (2015.01) |
| B33Y 30/00 | (2015.01) |
| D06B 11/00 | (2006.01) |
| D06H 7/00 | (2006.01) |
| D06M 10/02 | (2006.01) |
| D06P 5/00 | (2006.01) |
| G06T 7/00 | (2017.01) |

(52) U.S. Cl.
CPC .. *G06T 7/0004* (2013.01); *G06T 2207/30124* (2013.01); *G06T 2207/30152* (2013.01)

(58) Field of Classification Search
CPC ........... G06T 2207/30152; G06T 2207/20081; D10B 2401/18
See application file for complete search history.

(56) References Cited

U.S. PATENT DOCUMENTS

| | | | |
|---|---|---|---|
| 7,082,884 B2 | 8/2006 | Tajima et al. | |
| 7,334,533 B2 | 2/2008 | Tajima | |
| 7,370,590 B2 | 5/2008 | Tajima et al. | |
| 8,311,660 B2 | 11/2012 | Weedlun et al. | |
| 8,495,962 B2 | 7/2013 | Li | |
| 12,110,623 B2 | 10/2024 | Hoerr et al. | |
| 2003/0083593 A1* | 5/2003 | Marmaropoulos | A61B 5/02055 600/587 |
| 2004/0079208 A1* | 4/2004 | Carlson | B26D 7/086 83/13 |
| 2008/0289549 A1* | 11/2008 | Gardner | D05C 9/22 112/103 |
| 2009/0199449 A1* | 8/2009 | Isserow | G09F 3/08 40/299.01 |
| 2011/0240091 A1 | 10/2011 | Forster et al. | |
| 2019/0132948 A1* | 5/2019 | Longinotti-Buitoni | A61B 5/6805 |
| 2021/0237343 A1* | 8/2021 | Ferrara | B29C 64/209 |
| 2023/0286217 A1* | 9/2023 | Belocon | B33Y 50/02 |

FOREIGN PATENT DOCUMENTS

| | | |
|---|---|---|
| DE | 102019202501 A1 | 8/2020 |
| JP | 2006528842 A | 12/2006 |
| JP | 2017152700 A | 8/2017 |
| KR | 19990084452 A | 12/1999 |
| KR | 100456196 B1 | 11/2004 |
| KR | 100860191 B1 | 9/2008 |
| KR | 101635520 B1 | 7/2016 |

OTHER PUBLICATIONS

Kickstarter, PBC, "Electroloom—The World's First 3D Fabric Printer", https://www.kickstarter.com/projects/electroloom/electroloom-the-worlds-first-3d-fabric-printer, Aug. 5, 2016, 24 pages.

Coxworth, Ben, "3D-printing "error" used to produce high-tech textiles", https://newatlas.com/3d-printing/defextiles-3d-printed-textiles/, Oct. 29, 2020, 11 pages.

Mayer, Karl, "Additive manufacturing for the textile industry", https://www.textiletechnology.net/technology/news/TITVKarl-Mayer-Additive-manufacturing-for-the-textile-industry-13208, Apr. 17, 2019, 1 page.

https://twitter.com/ZskTechEmbroid, "Concept of an embroidery machine combining an embroidery head, a wire placement head and a dispenser head for the production of #etextiles.", https://twitter.com/ZskTechEmbroid/status/1272859155615952898, Jun. 16, 2020, 2 pages.

ZSK Stickmaschinen GmbH, "ZSK Vision System—The Solution for Different Tolerances", https://www.zsk.de/en/industries-and-applications/technical-embroidery/camera-solutions.php, downloaded Nov. 21, 2022, 9 pages.

Schmelzeisen, David et al., "4D Textiles: Hybrid Textile Structures that Can Change Structural Form with Time by 3D Printing", https://doi.org/10.1007/978-3-319-69050-6_17, Dec. 12, 2017, 13 pages.

Amazon.com, "Merrycolor Funny Sequin Throw Pillow Cover Magic Reversible Mermaid Sequin Pillow Case Decorative Cushion Cover Glitter Accent Pillow 16×16 Inches(Purple)", https://www.amazon.com/Merrycolor-Reversible-Mermaid-Decorative-Cushion/dp/B085WL9RRY, downloaded Sep. 13, 2022, 6 pages.

Hirsch Solutions Inc., "Tajima Sumo Singlehead/SEIT SHL-5 Laser Combo", https://impressionsmagazine.com/products/embroidery/tajima-sumo-singleheadseit-shl-5-laser-combo/, downloaded Sep. 13, 2022, 3 pages.

ZSK Machines, "Cording & Ribbon Device, https://web.archive.org/web/20211020064357/www.zskmachines.com/specialty-embroidery-accessories/specialty-attachments/cording-ribbon-device/", downloaded Sep. 13, 2022, 1 page.

ZSK Machines, "Sequins Device, https://web.archive.org/web/20211020060501/https://www.zskmachines.com/specialty-embroidery-accessories/specialty-attachments/sequins-device/", downloaded Sep. 13, 2022, 1 page.

ZSK Machines, "Large Format 24 Needle, Bridge-Style Single Head Machine", https://web.archive.org/web/20211020070059/https://www.zskmachines.com/embroidery-machines/racer-1-xl-24-needle/, downloaded Sep. 13, 2022, 2 pages.

ZSK Machines, "New T8 Windows Based Controller, https://web.archive.org/web/20211020071417/https://www.zskmachines.com/embroidery-software/networking/", downloaded Sep. 13, 2022, 1 page.

Düzey Spangle, "Total spangle solutions", vol. 10, www.e-duzey.com, downloaded Sep. 13, 2022, 42 pages.

Anderson, Topher, ZSK Stickmaschinen, "White Paper—a Guide to Technical Embroidery", downloaded Dec. 15, 2021, 33 pages.

ZSK Stickmaschinen GmbH, "Functional Sequins (FS)—The Fusion of Electronics and Textiles", Oct. 15, 2021, 1 page.

ZSK Stickmaschinen GmbH, "Cord Device—Precious Finish for Your Embroidery", Oct. 21, 2021, 1 page.

ZSK Stickmaschinen GmbH, "Hot Air Cutting—the Art of Cutting with Hot Air", Oct. 21, 2021, 1 page.

ZSK Stickmaschinen GmbH, "SPRINT—Versatile Single-Head Embroidery Machines", https://www.zsk.de/en/embroidery-machines/sprint.php, Oct. 16, 2021, 11 pages.

ZSK Stickmaschinen GmbH, "Safety Equipment—Adapt Your System to Operational Requirements", downloaded Sep. 13, 2022, 1 page.

Ahn, Sung-Hoon et al., "Anisotropic material properties of fused deposition modeling ABS", vol. 8, No. 4, 2002, 248-257, ISSN 1355-2546.

* cited by examiner

VARIOUS ATTACHMENTS FOR ADDITIVE TEXTILE MANUFACTURING MACHINES

CROSS REFERENCE TO RELATED APPLICATION

This application claims the benefit of U.S. Provisional Application No. 63/298,309, filed Jan. 11, 2022, the entirety of which is incorporated herein by reference.

TECHNICAL FIELD

The present disclosure relates to additive textile manufacturing processes (e.g., embroidery, weaving, knitting, etc.).

BACKGROUND

Additive textile manufacturing machine attachments can be used to augment the functionality of an additive textile manufacturing machine. For example, attachments can allow additional materials and processes to be automatically/robotically integrated into the machine. Attachments can be modularly designed, and, therefore, can be added to or removed from a machine as desired, e.g., before an additive textile manufacturing process/run. This improves the versatility of machines, such as larger production machines. In particular, machines can be quickly reconfigured with attachments to match the technical needs of the specific manufacturing process without requiring investment in new, customized machines. As a result, attachments can be particularly effective in enabling a single stock machine to carry out additive textile manufacturing processes for multiple technical textiles each having unique technical requirements. Without attachments, the single stock machine would be unable to efficiently produce technical textiles that are often lower in production numbers but higher in value.

Examples of existing embroidery machine attachments include: sequin attachments for placement of small plastic sequins; cording attachments for textile, leather, or soft wire cord placement; hot-air cutting attachments for cutting fabric with a cone of hot air used in applique applications; laser cutting attachments for cutting through thick materials; beading attachments for bead placement in ornamental designs; boring attachments for shear-cutting fabric in different regions to create holes in the fabric or lace-like designs; cutting needle attachments for cutting fabric; optical positioning attachments for detecting and compensating for translation, rotation, or scaling effects during an embroidery stitching process; and circuit board placement attachments for embroidering circuit boards into a fabric.

DESCRIPTION OF EXAMPLE EMBODIMENTS

Overview

Various attachments for additive textile manufacturing machines are attached. In one example embodiment, an apparatus is provided which comprises a connector component and a liquid deposition component. The connector component is configured to attach to an additive textile manufacturing machine that produces a textile product. The liquid deposition component is configured to deposit a liquid on one or more materials of the textile product.

Example Embodiments

Existing additive textile manufacturing machine attachments cannot adequately meet demands in the rapidly evolving field of textile engineering (e.g., technical embroidery). In particular, existing attachments do not provide additive textile manufacturing machines with sufficient material use or textile design. Accordingly, various additive textile manufacturing machine attachments are provided herein to expand the current capabilities of additive textile manufacturing machines.

Attachments described herein may allow integration of different types of materials with unique design possibilities into a functionalized fabric, such as a smart textile or interactive technical textile with interactive properties. Automated processes described herein may use attachments to apply materials such as customized wires, circuit boards, fasteners, connectors, and stiffeners. Such materials may provide the textile with an enhanced range of functionality.

Various additive textile manufacturing machine attachments are described herein to augment additive textile manufacturing processes in a scalable manner. Examples of attachments provided herein include: welding attachments; 3D printing attachments; adhesive dispensing attachments; ink applicator attachments; ultrasonic head attachments; relocation attachments; camera-assisted circuit board stitching attachments; cutting attachments; cord assembly placement frame attachments; electronics pick-and-place attachments; and error detection attachments. These attachments may be configured to attach/connect to an additive textile manufacturing machine (e.g., an embroidery machine) that produces a textile product.

The attachments described herein may be implemented individually or collectively. For instance, two or more of the attachments described herein may be combined to form a single attachment. In one specific example, a welding attachment and an error detection attachment may be combined into a single welding and error detection attachment. Other embodiments may be envisioned. Any suitable number and/or types of attachments may be combined into a single additive textile manufacturing attachment. Additionally/alternatively, an additive textile manufacturing machine may be equipped with multiple attachments and may use the multiple attachments as part of a single additive textile manufacturing process. Multiple attachments of the same or different type may be implemented together in the same additive textile manufacturing process.

Figure 1:
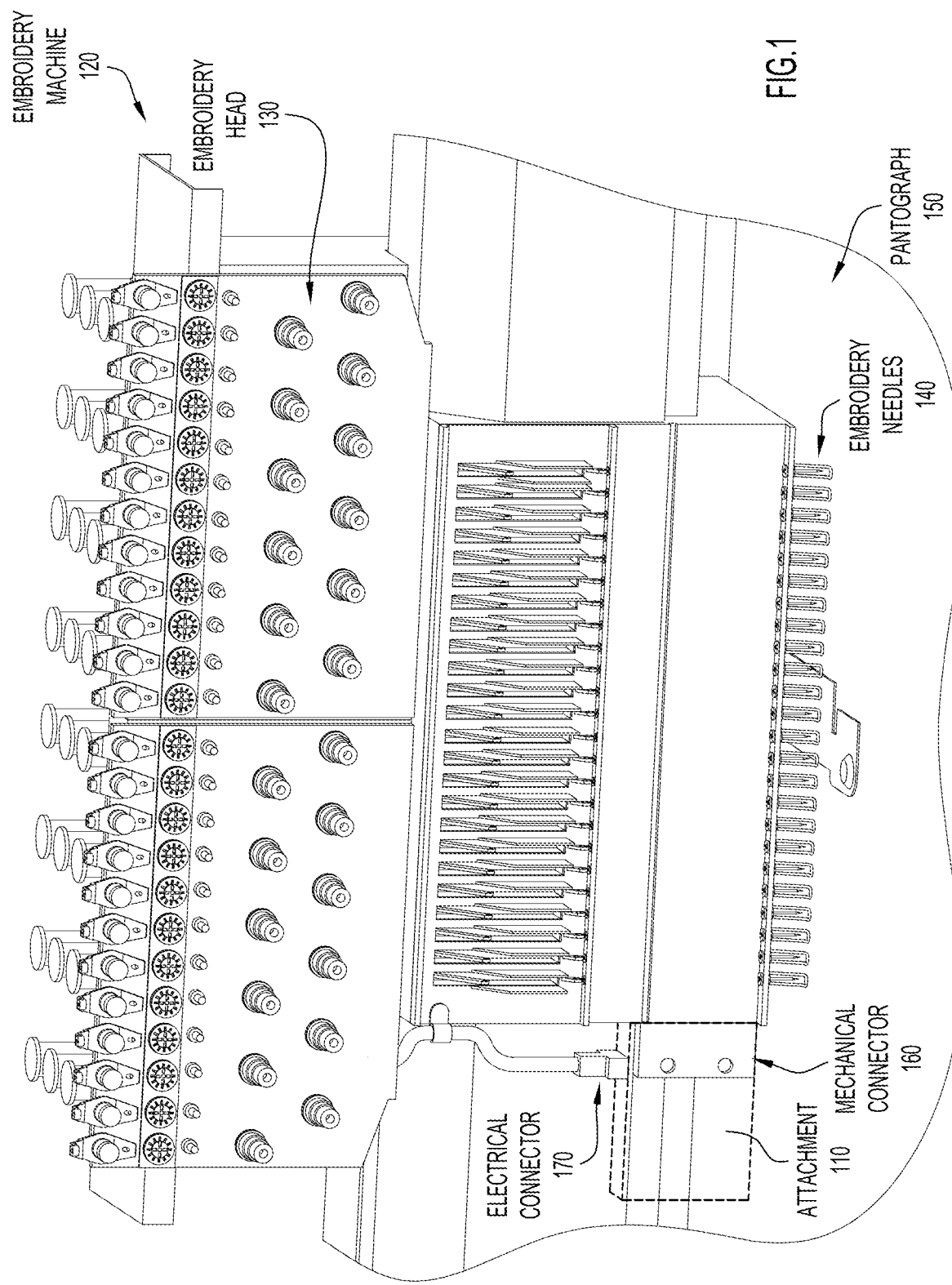
FIG. 1 illustrates a system including an attachment described herein that is integrated with an embroidery machine, according to an example embodiment.

FIG. 1 illustrates a system 100 including an attachment 110 that is integrated with an embroidery machine 120, according to an example embodiment. The embroidery machine 120 includes an embroidery head 130, embroidery needles 140, a pantograph 150, a mechanical connector 160 for an embroidery attachment (e.g., attachment 110), and an electrical connector 170 for an embroidery attachment. A block representation of the attachment 110 is shown to illustrate the placement/location of the attachment 110, in one example.

The embroidery head 130 depicted in FIG. 1 is an F-head, though it will be appreciated that attachments described herein may be equipped to any suitable type of head (e.g., an embroidery head type such as W-head, K-head, etc.). In this example, the attachment 110 may plug into the F-head through holders located on opposite sides of the F-head. FIG. 1 illustrates the placement/location of the attachment 110 on one side of the F-head. The embroidery machine 120 may include up to fifty or more F-heads, each configured to accept up to two attachments (one on each side) simultaneously. Thus, the embroidery machine 120 may accept a total of up to one hundred or more attachments simultaneously.

The attachment 110 may be mechanically, electrically, and/or programmatically connected to the embroidery machine 120 for control and integration. In certain examples, the attachment 110 may first be mechanically connected and then electrically/programmatically connected. The attachment 110 may be mechanically fastened to the embroidery machine 120 using the mechanical connector 160. In one example, the mechanical connector 160 may include one or more screws that provide high tolerance, favorable positional location, and a sturdy attachment point. Screws may, for example, securely fasten attachments to larger embroidery machines, reducing vibrational effects and standardizing a constant location where the attachment 110 can be calibrated.

The attachment 110 may also be connected to an electrical system of the machine, via the electrical connector 170, to obtain power and direction. The attachment 110 may be integrated directly to a machine controller module that includes additive textile manufacturing machine code and is running operation steps. In some examples, a single controller module may be used to direct the motion and behavior of embroidery machine parts (e.g., the embroidery needles 140, attachment 110, etc.), to allow for uniform and controlled synchronization of both the embroidery machine 120 and the attachment(s) (e.g., attachment 110).

Attachment 110 may be: a welding attachment; a 3D printing attachment; an adhesive dispensing attachment; an ink applicator attachment; an ultrasonic head attachment; a relocation attachment; a camera-assisted circuit board stitching attachment; a pneumatic cutting attachment; a cord assembly placement frame attachment; an electronics pick-and-place attachment; or an error detection attachment. Each attachment is described in turn below.

FIGS. 2-10 relate to the welding attachment, 3D printing attachment, adhesive dispensing attachment, and ink applicator attachment. Each of these attachments includes a connector component and a liquid deposition component. The connector component is configured to attach to an additive textile manufacturing machine (e.g., via the mechanical connector 160 and/or the electrical connector 170) that produces a textile product. The liquid deposition component is configured to deposit a liquid on one or more materials of the textile product.

Figure 2:
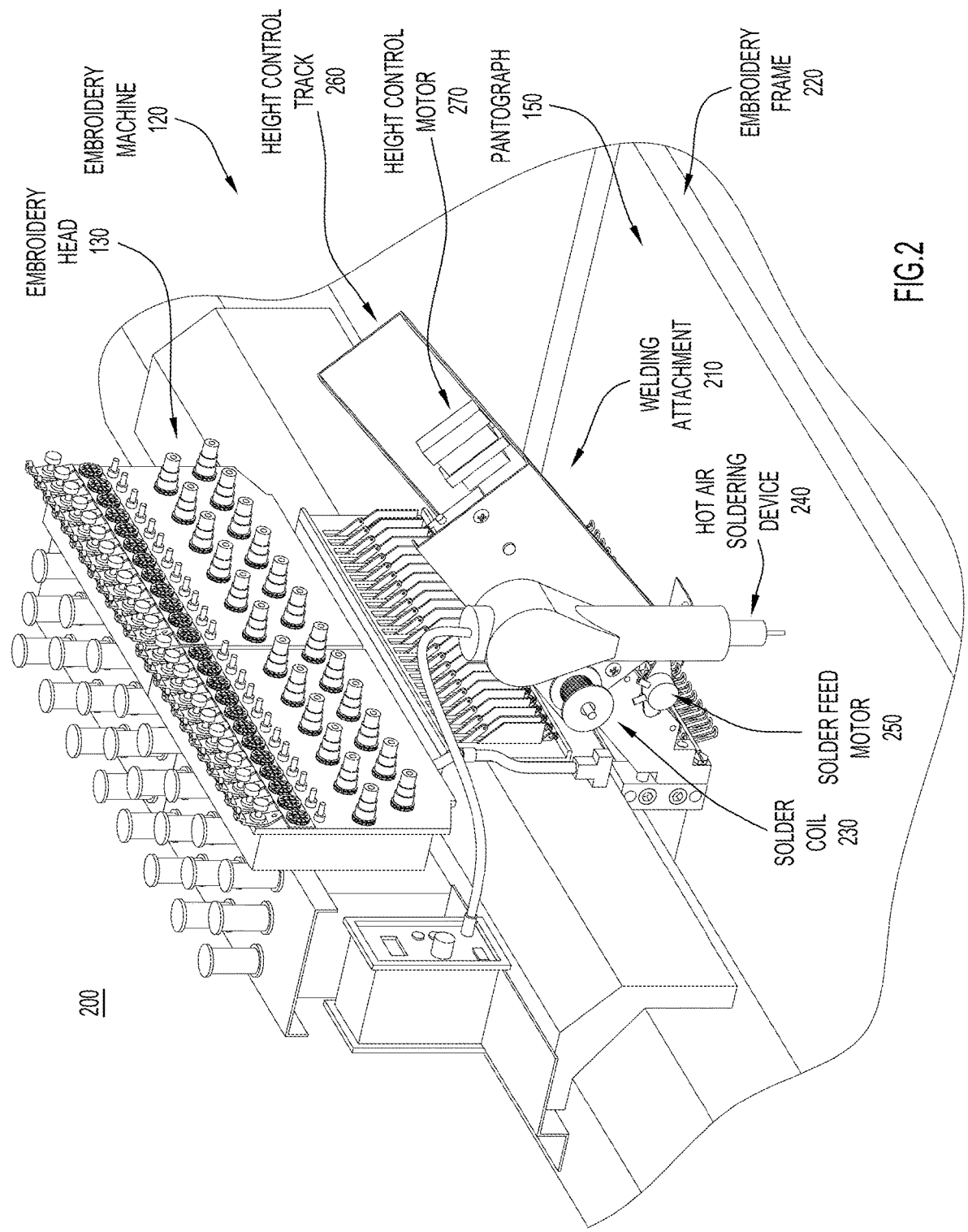
FIGS. 2 and 3 illustrate a system including a welding attachment described herein that is integrated with an embroidery machine, according to an example embodiment.
Figure 3:
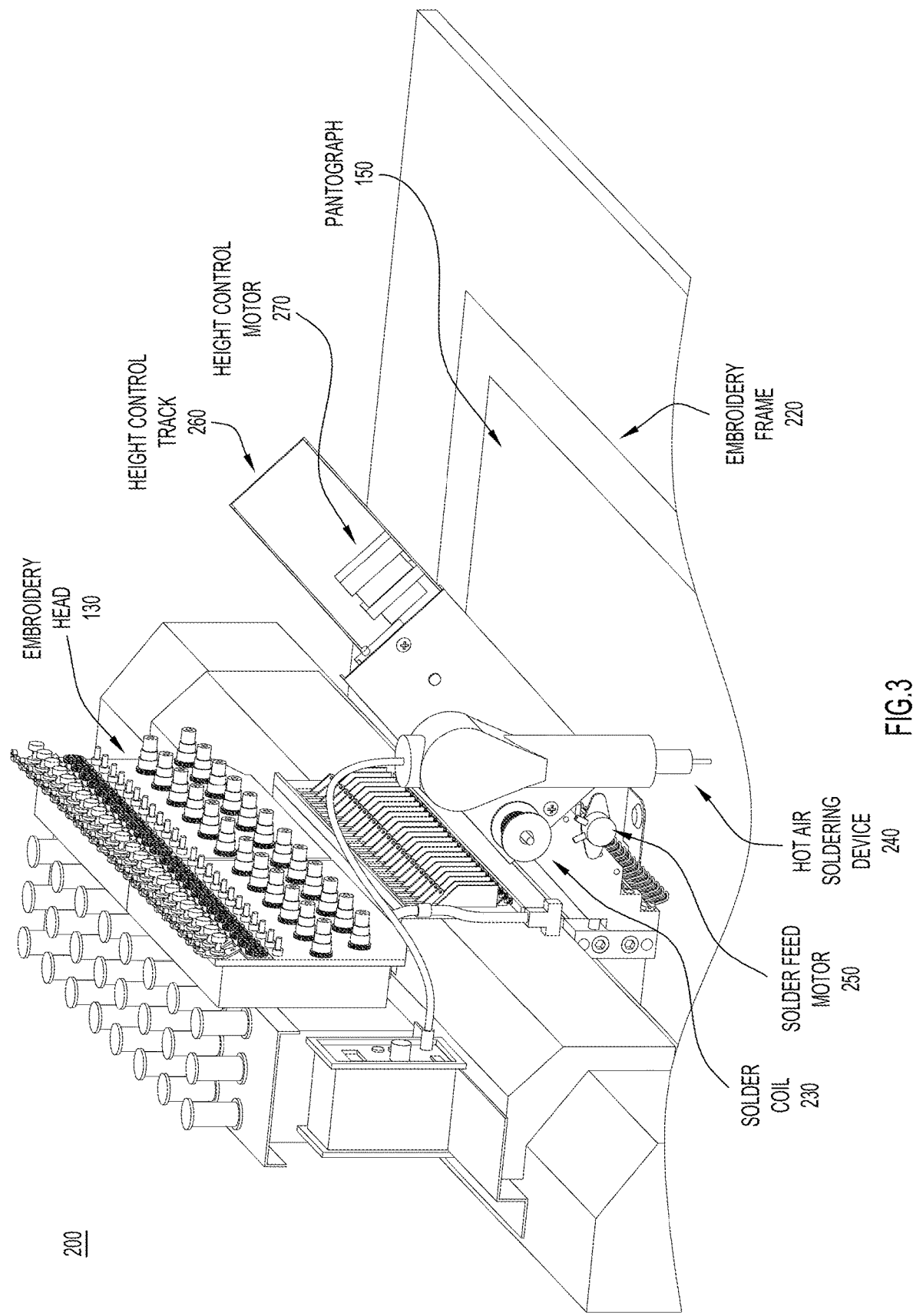

Turning first to FIGS. 2 and 3, FIGS. 2 and 3 illustrate different views of a system 200 including a welding attachment 210 that is integrated with the embroidery machine 120, according to an example embodiment. The embroidery machine 120 includes an embroidery head 130, a pantograph 150, and an embroidery frame 220. The welding attachment 210 includes a solder coil 230, a hot air soldering device 240 configured to melt the solder from the solder coil 230, a solder feed motor 250 configured to controllably feed/drive the solder from the solder coil 230 to the heating region (e.g., tip) of the hot air soldering device 240, a height control track 260, and a height control motor 270 configured to raise and/or lower the hot air soldering device 240 on the height control track 260. The welding attachment 210 may be positioned similarly to the attachment 110.

In this example, the hot air soldering device 240 is a liquid deposition component configured to deposit solder on one or more materials of a textile product. The solder coil 230 may include any suitable type of solder, such as a resin flux cored tin or lead based solder wire that is primarily used for soldering electronics to a circuit board. The hot air soldering device 240 may be a Surface-Mount Device (SMD) rework station, and may be configured to produce a small cone of tightly directed hot air. In one example, the tip of the hot air soldering device 240 may be a metal direct heating element.

In operation, the embroidery machine 120 may mechanically control the height of the hot air soldering device 240 using the height control motor 270. For example, upon activation, the embroidery machine 120 may use the height control motor 270 to lower the hot air soldering device 240 along the height control track 260 toward the pantograph 150 which brings the welding attachment 210 closer to the fabric for soldering. Conversely, upon deactivation, a controller module of the embroidery machine 120 may send a command to the height control motor 270 to raise the welding attachment 210 along the height control track 260 from the pantograph 150 and fabric.

The welding attachment 210 may enable the embroidery machine 120 to weld components as part of an embroidery process. More specifically, the embroidery machine 120 may utilize the robotic motion of the pantograph 150 to apply solder to various points on the textile. The solder feed motor 250 may drive the solder from the solder coil 230 to the tip of the hot air soldering device 240, which may in turn melt and output the solder (e.g., including flux). Thus, the welding attachment 210 may deliver heat, solder, and/or flux to a textile in an embroidery machine 120.

The temperature of the hot air soldering device 240 may be set within the welding attachment 210 to ensure proper soldering and/or solder joint melting. Furthermore, the solder feed motor 250 may ensure that the solder is dispensed towards the hot air soldering device 240 in correct proportions for soldering. The solder feed motor 250 may be driven by the controller module, or independently of the embroidery machine 120. In certain examples, liquid paste solder may be used instead of the solder coil. In these examples, the liquid paste solder may be fed toward the hot air soldering device 240 and applied by the welding attachment 210 using a syringe-based solder applicator.

The welding attachment 210 may fix materials with certain technical properties (e.g., rigidity) to fabrics as part of an embroidery process. For example, the welding attachment 210 may be used to connect circuit boards, metal inserts, metal screws, composite hardware, metal rings, and other types of rigid fasteners to other rigid components and/or textiles. The welding attachment 210 may, for instance, allow the embroidery machine 120 to mount electronics and other components and solder them directly to the textile during the embroidery process. Thus, the welding attachment 210 may allow a single embroidery machine (e.g., embroidery machine 120) to perform enhanced welding operation automatically while reducing or eliminating the need for additional machines and processes.

By furthering the ability of manufacturers to interconnect rigid and flexible substrates, the welding attachment 210 may provide fabrics with enhanced functionality. Three specific use cases are provided as follows, though it will be appreciated that the welding attachment 210 may be used for any suitable application.

In the first use case, the welding attachment 210 automatically welds wires/threads to wires/threads on textiles to create a fully automated joint between two different wires on an embroidery machine. For example, the embroidery machine 120 may lay a first thread down, apply solder to the first thread using the welding attachment 210, lay a second thread on top, apply solder to the second thread, etc. This allows complex patterns and specific geometries that cannot be completed as a single post-process, to be built sequentially. Thus, the welding attachment 210 may create a connection between a soft textile with wires disposed therein, and sensors or a power supply. This may have applications in flexible antenna engineering, thermal and sensing functions (e.g., car seat heating pads), etc. Instead of using secondary/post-processes for connecting/soldering/welding wires together (e.g., manually applying twist connectors or hand-soldering the connection), the embroidery machine 120 may use the welding attachment 210 in a single fully-controlled, robotic process.

In the second use case, the welding attachment 210 welds wires to circuit boards on textiles. Here, the embroidery machine 120 may embroider wires into a fabric and solder the wires directly to a circuit board using the welding attachment 210. The welding attachment 210 may remove pitfalls associated with the existing technique of using conductive thread to create an electrical connection between an embroidered circuit board and the surrounding embroidery. More specifically, conductive thread stitching on an embroidery machine 120 often cannot withstand the same temperature requirements such as wires. Conductive thread also has significantly higher resistances than its wire counterpart. By automating the electrical connection using the welding attachment, a connection between a wire in a fabric and a circuit board may be created that is high quality and quickly manufactured in a fully automated process with higher conductivity than conductive thread techniques.

In the third use case, the welding attachment 210 may weld circuit board components onto circuit boards. For example, the embroidery machine 120 may be used as a textile pick-and-place machine to allow small components to be welded down to a larger circuit board on the embroidery machine. This may have specific applications in last-minute design. For instance, the welding attachment may be used to change resistive values on resistive sensors on-the-fly to compensate for resistivities found in new conductive threads. Alternatively, the welding attachment 210 may be used to create serial numbers on individual circuit boards on the embroidery machine 120 using resistors, thereby allowing for higher levels of customization and tracking.

Figure 4:
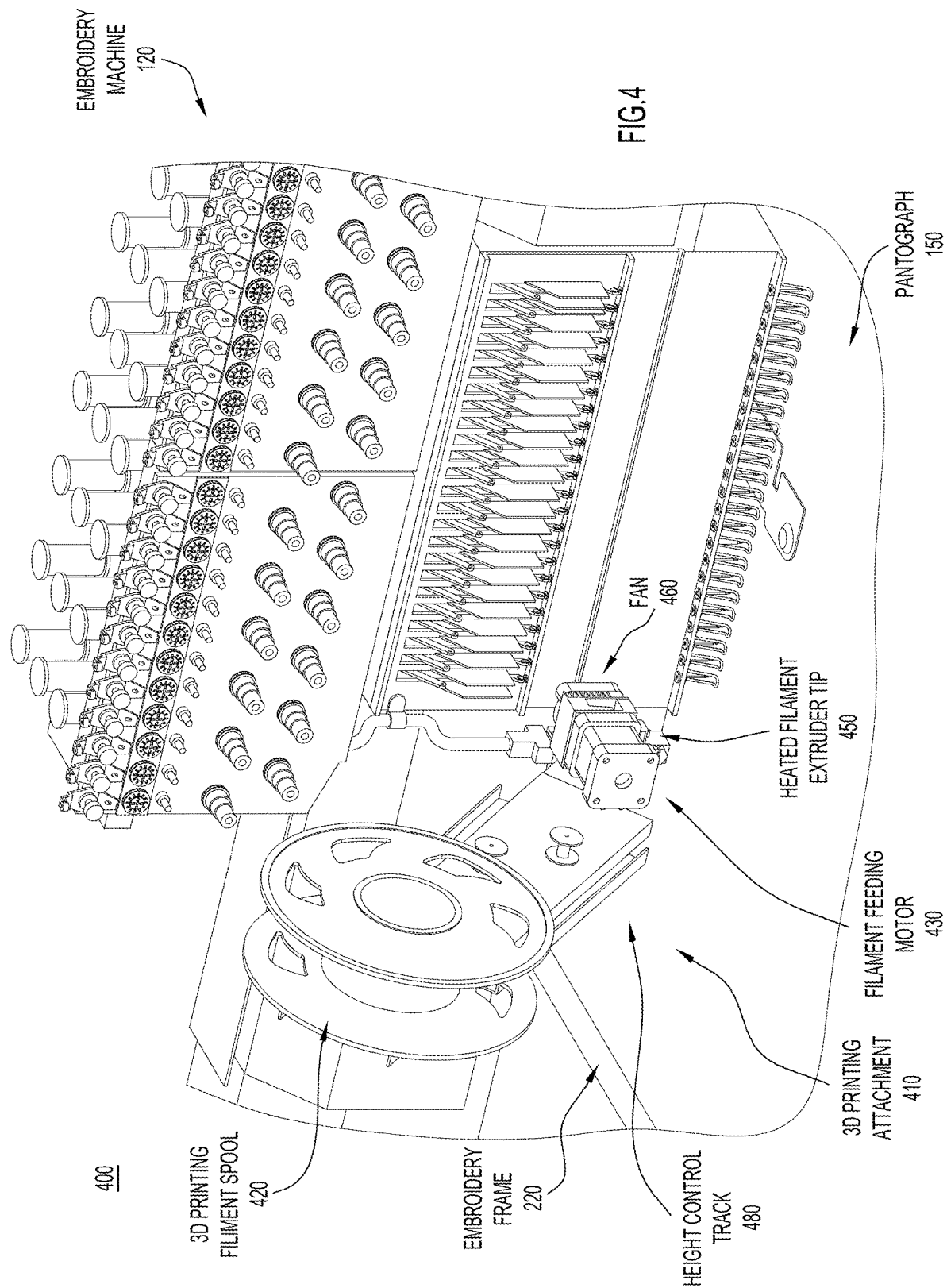
FIGS. 4-6 illustrate a system including a 3D printing attachment described herein that is integrated with an embroidery machine, according to an example embodiment.
Figure 5:
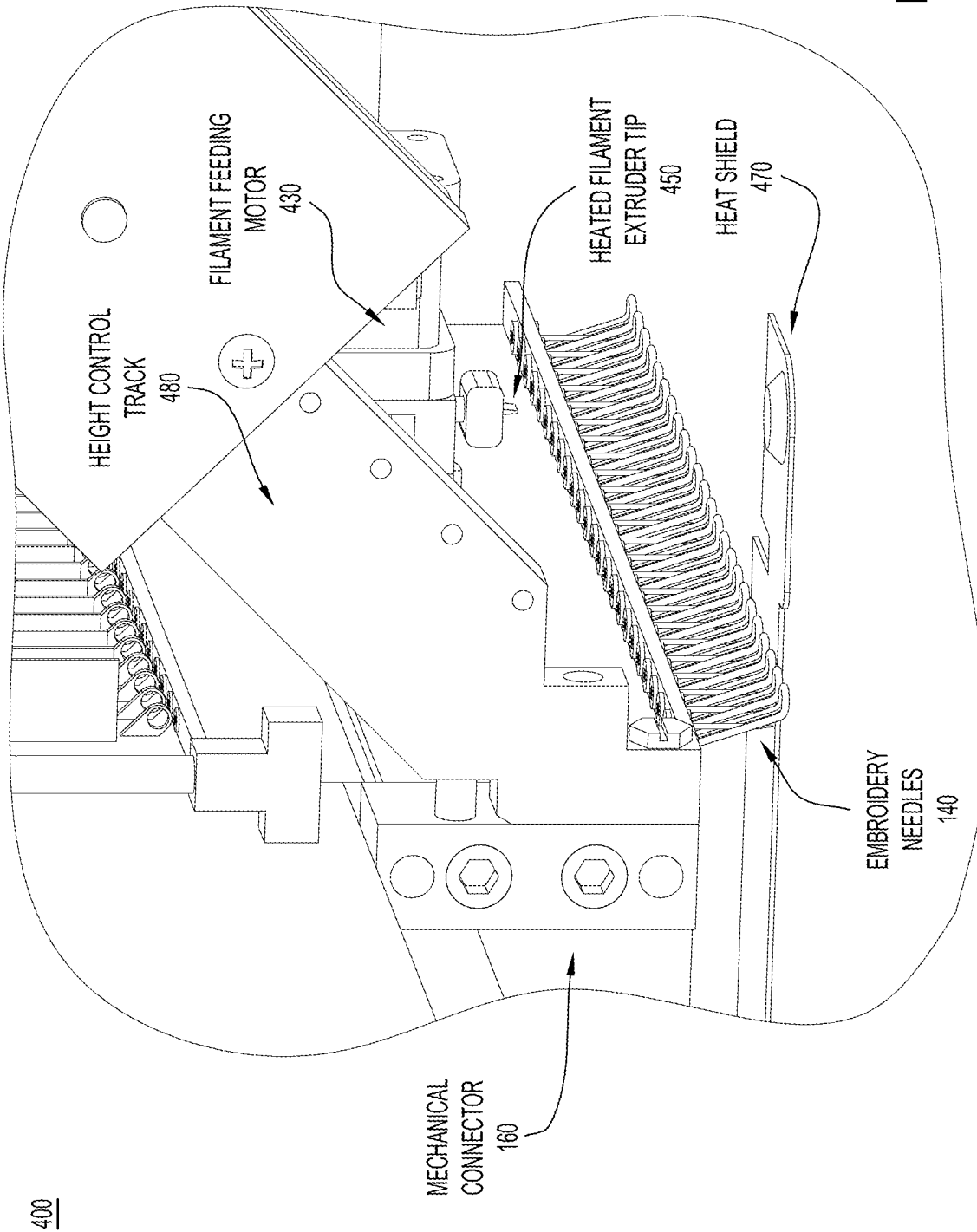
Figure 6:
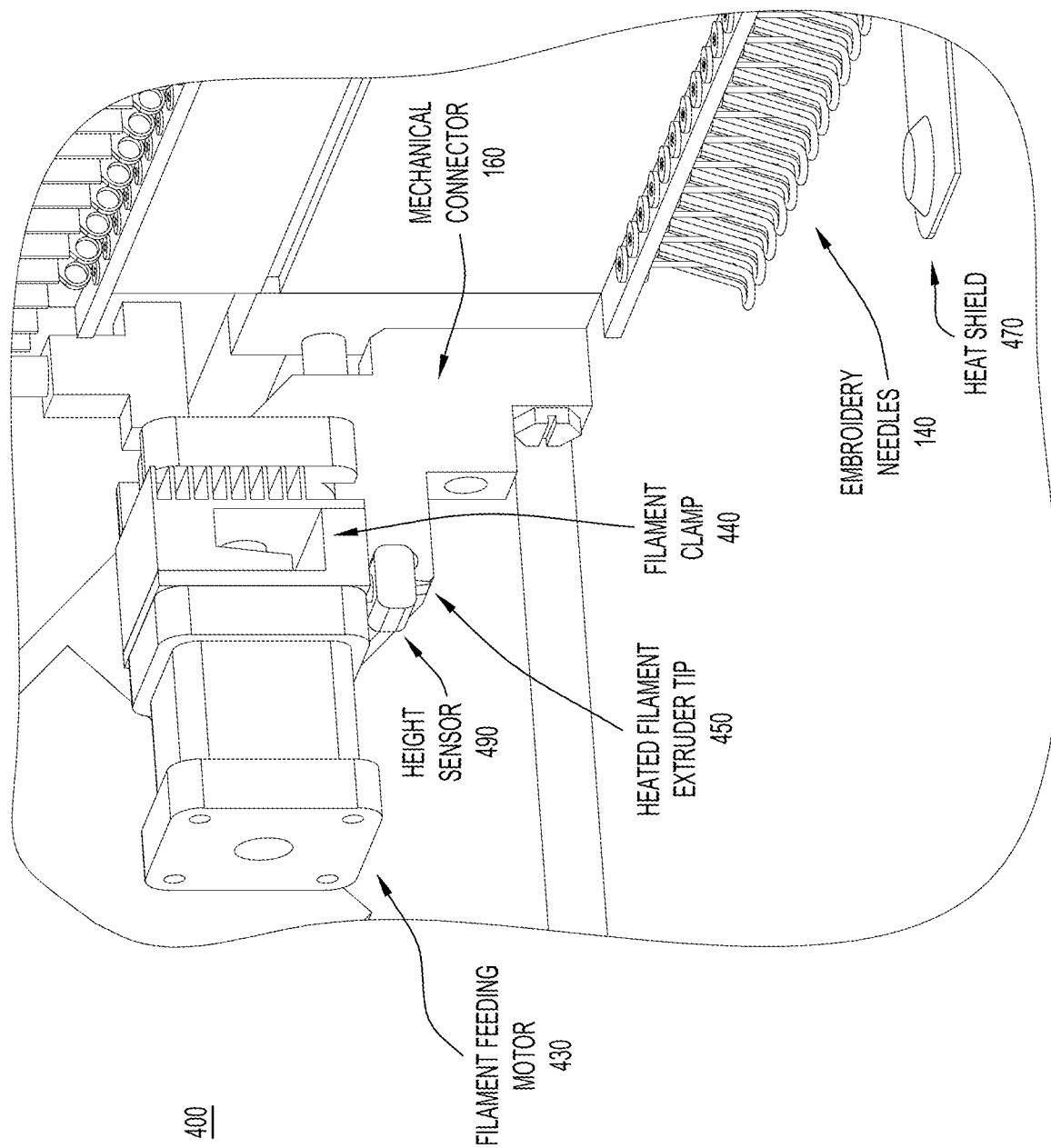

FIGS. 4-6 illustrate different views of a system 400 including a 3D printing attachment 410 that is integrated with the embroidery machine 120, according to an example embodiment. The 3D printing attachment 410 includes a 3D printing filament spool 420, a filament feeding motor 430 configured to provide the filament for 3D printing, a filament clamp 440 integrated with the filament feeding motor 430 configured to grip the filament, a heated filament extruder tip 450 that is disposed on a 3D printing head and configured to melt the filament and print to a textile on the embroidery machine 120, a fan 460 configured to cool the heated filament extruder tip 450 and filament, a heat shield 470 configured to protect the pantograph from the heated filament extruder tip 450, a height control track 480, and a height sensor 490 configured to detect the initial fabric height.

The 3D printing attachment 410 may be positioned similarly to the attachment 110. In one example, the 3D printing attachment 410 may be retrofitted onto an existing embroidery machine (e.g., embroidery machine 120) using one of the attachment slots located on the left or right side of an F-head. The 3D printing attachment 410 may secure to the embroidery machine 120 mechanically via the mechanical connector 160 and electrically via an electrical connector (e.g., electrical connector 170) to allow the 3D printing attachment 410 to integrate with a controller module of the embroidery machine 120.

In this example, the heated filament extruder tip 450 is a liquid deposition component configured to deposit a 3D printing material on one or more materials of a textile product. The filament may include any suitable material, such as Polylactic Acid (PLA), Acrylonitrile Butadiene Styrene (ABS), Thermoplastic Polyurethane (TPU), any suitable thermoplastic material, etc. The heated filament extruder tip 450 may be any suitable high-temperature nozzle. In one example, the heated filament extruder tip 450 may feed the filament as part of a Fused Deposition Modeling (FDM) process.

In operation, the embroidery machine 120 may switch from a stitching needle to the 3D printing attachment 410. When the 3D printing attachment 410 is activated, the embroidery machine 120 may, using one or more activation motors, lower the heated filament extruder tip 450 along the height control track 480 toward the surface of the fabric. The embroidery machine 120 may continue lowering the heated filament extruder tip 450 until the height sensor 490 indicates that the heated filament extruder tip 450 should stop.

The height sensor 490 may permit the 3D printing attachment 410 to determine the location of the base of the fabric so that the printing process may proceed directly on the fabric.

Once the 3D printing attachment 410 has been activated and lowered to the base of the fabric on the embroidery machine 120, the filament feeding motor 430 may, using the filament clamp 440, pull the filament from the 3D printing filament spool 420 down to the heated filament extruder tip 450. The heated filament extruder tip 450 may selectively melt the filament down to a liquid and deposit the liquefied filament material on the textile. As the embroidery frame (e.g., embroidery frame 220) and pantograph 150 move beneath the 3D printing attachment 410, a line of liquefied filament material is placed on and/or embedded into the textile.

The pantograph 150 may drive the motion of the 3D print to create suitable design. Throughout the 3D printing process, the heated filament extruder tip 450 may be raised or lowered relative to its height at previously printed areas. For example, it may be desirable to change the height of the heated filament extruder tip 450 at certain stitch locations. The height may be set locally on the 3D printing attachment 410 or managed by the controller module.

The 3D printing attachment 410 may enable the processes for manufacturing technical textile with specific/unique functions. Unlike existing techniques, in which a textile is placed under the printing surface of a 3D printer and the 3D printer is creates a fabric with different plastic reinforcement, using the 3D printing attachment 410 to apply a melted filament to a fabric may allow for the scalable production of these variable stiffness technical textiles on a single machine (e.g., the embroidery machine 120).

Because it may connect to the embroidery machine 120 via an attachment slot on the side of the F-head (e.g., via the mechanical connector 160 and an electrical connector, e.g., electrical connector 170), the 3D printing attachment 410 may provide significant economic and design advantages to 3D printing onto a flexible textile. Economically, the 3D printing attachment 410 permits the embroidery machine 120—which may be configured to embroider/stitch/sew fabric—to add selective mechanical reinforcement through 3D printing. This may improve 3D printing accuracy as certain steps (such as realigning the fabric) and additional equipment (such as a separate 3D printing machine) may be eliminated. That is, conventionally, a piece of fabric that has been embroidered must be unclamped from an embroidery machine and then re-clamped into the separate 3D printing machine, which can introduce alignment errors; eliminating the step of alignment in a separate 3D printing machine may eliminate alignment errors, thereby improving accuracy. The 3D printing attachment 410 may thus enable further development of mixed material techniques.

The 3D printing attachment 410 also provides significant design advantages that may enable further technological advancements. For example, the stackable materials the material (e.g., textile) may be registered in the embroidery machine 120 and selectively embroidered and 3D printed to create one or more stackable materials. Thus, embroidered 3D-printed stack-up regions may be created using the 3D printing attachment 410. In one example, the 3D printing attachment 410 may stiffen a thread that was used to embroider an area of fabric by printing on top of the thread. In a further example, a layer of thread (e.g., different-colored thread) may be stitched over top of the 3D-printed thread to protect the 3D-printed region as well as the original thread.

Five specific use cases are provided as follows, though it will be appreciated that the 3D printing attachment 410 may be used for any suitable application. In the first use case, the 3D printing attachment 410 may encapsulate the embroidered wire. In one example, the 3D printing attachment 410 may cover regions that include embroidered wires with melted filament material to make the region waterproof and environmentally resistant. Generally, embroidered fabrics may have small holes that expose embroidered wires to water, salt, air, laundry detergent, and other potentially wire-damaging substances. 3D printing over the top of the wire on the embroidery machine 120 after the wire has been stitched down may coat the wire in a water-protective covering (e.g., the filament material), which may add unique characteristics to the textile.

In one specific example, the embroidery machine 120 may embroider the wire and then switch over to the 3D printing attachment 410 to heat the heated filament extruder tip 450. Once the heated filament extruder tip 450 is heated, the filament feeding motor 430 may feed the filament from the spool down to the textile surface. The heated filament extruder tip 450 may melt the filament and extrude the melted filament onto the wire. The embroidery machine 120 may use the motion of the pantograph 150 to control the location and speed of filament deposition. To ensure that a thick covering of protective encapsulation is provided over the wire, the geometry/path of the filament may follow the placement of the wire on the fabric In the second use case, the 3D printing attachment 410 may encapsulate an electronic circuit board. For example, unlike existing techniques for stitching circuit boards to fabrics, the 3D printing attachment 410 may be used to waterproof stitched circuit boards. More specifically, the 3D printing attachment 410 allows for the filament (e.g., thermoplastic material) to be fused and deposited on top of the circuit board on the embroidery machine 120, allowing for waterproofing of one or more regions on the textile circuit boards.

In some examples, the embroidery machine 120 may connect the circuit board to the textile and then encapsulate the circuit board in a sequential process. This may preserve the electrical connection between the circuit board, the conductive thread, and the embroidered wires. In particular, by covering the relevant electrical connections with protective material, the textile circuit boards may be waterproofed on the embroidery machine 120. This encapsulation may prevent debris, water, detergent, and other materials that would otherwise adversely affect the circuit board from contacting the circuit board.

In the third use case, the 3D printing attachment 410 may provide controllable mechanical properties such as stiffness. In one example, the embroidery machine 120 may use the 3D printing attachment 410 to tailor mechanical stiffness within a fabric. The stiffness of the fabric may be anisotropic or have different values in different directions/locations. To impart customized stiffness to the fabric, the 3D printing attachment 410 may selectively place a stiff material (e.g., the filament) into a less stiff material or more compliant material. For instance, the 3D printing attachment 410 may place regions of a stiff plastic filament into a textile to change the textile's ability to fold, and possibly also change other mechanical properties about the textile such as directional strength.

Unlike in existing techniques, the embroidery machine 120 may mechanically reinforce the textile using the 3D printing attachment 410. By printing the filament on a highly elastic, isotropic, knit material, the 3D printing attachment 410 may create areas and lines that have a different elasticity or stretchability from the native, unprinted fabric. Thus, the 3D printing attachment 410 may allow for selective reinforcement. This may be used to create wearables or garments that are comfortable but also mechanically prevent sensitive areas that contain sensors or wires from stretching and tearing. Additionally, the 3D printing attachment 410 may allows for easier registration since the fabric may remain within the same embroidery machine 120 and process. This may enable tight control of the location of the 3D-printed filament.

In the fourth use case, the 3D printing attachment 410 may enable the embroidery machine to print regions in textiles (e.g., wearables) for haptic feedback (e.g., soft haptics) in Virtual Reality (VR) and/or Augmented Reality (AR) applications. For example, the 3D printing attachment 410 may encapsulate plastic around a shape memory alloy, which may cause some of the thermal load in the alloy to be dispersed through the thermoplastic material, thereby reducing the chance of burning when worn next to the skin. Additionally, because the 3D printed regions are stiffer than in the surrounding fabric, and because the shape memory alloy may move more in regions with less stiffness or 3D-printed material, this may create regions for selective motion within the textile. This motion may be used for haptics applications as well as soft robotics applications.

In the fifth use case, the 3D printing attachment 410 may perform 3D printing operations with hot glue application. For example, a thermoplastic glue may be used as the filament, in which case the 3D printing attachment 410 may melt the glue using the heated filament extruder tip 450 and apply the glue to the fabric. The glue may be used to hold circuit boards, metal inserts, and other rigid components to the fabric automatically. Hot glue filament may be an example of a thermoplastic filament that can be used to bind materials together using the 3D printing attachment 410.

Figure 7:
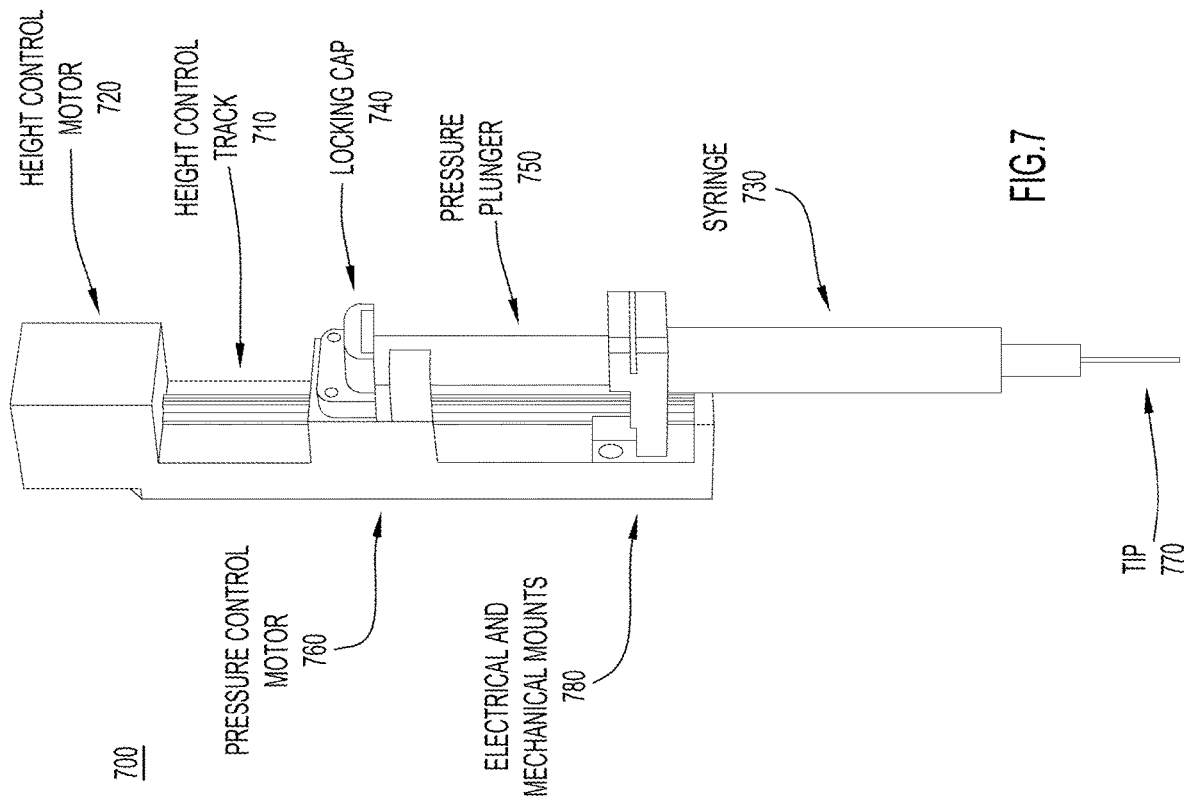
FIG. 7 illustrates an adhesive dispensing attachment, according to an example embodiment.

FIG. 7 illustrates an adhesive dispensing attachment 700, according to an example embodiment. The adhesive dispensing attachment 700 includes a height control track 710, a height control motor 720 configured to raise and lower the adhesive dispensing attachment 700 along the height control track 710, a cartridge/syringe 730 configured to house a paste, a locking cap 740 configured to secure the syringe 730, a pressure plunger 750 configured to force extrusion of the paste from the syringe 730, a pressure control motor 760 configured to control the pressure of the forced extrusion of the paste, a tip 770 configured to deliver the paste to an embroidery frame (e.g., embroidery frame 220), and electrical and mechanical mounts 780 configured to secure the adhesive dispensing attachment 700 to an embroidery machine (e.g., embroidery machine 120).

In this example, the tip 770 is a liquid deposition component configured to deposit adhesive (e.g., paste, gel, glue, or other liquid) on one or more materials of a textile product. The adhesive may be used to fix irregularly shaped components to a textile for temporary or permanent usage. The glue may be air- or ultraviolet-curable. Alternatively, the adhesive may be a solder paste that can be used to selectively apply solder to a fabric in specific locations (e.g., for mounting components on circuit boards). It will be appreciated that the syringe 730 may be configured to house any suitable liquid adhesive. The pressure control motor 760 may be any suitable driving motor (e.g., a screw motor) configured to apply pressure that is sufficient to expel the adhesive from the syringe 730 to the target fixation point. Additionally/alternatively, a peristaltic motor may be employed to drive a lower-viscosity adhesive from the syringe 730.

Figure 8:
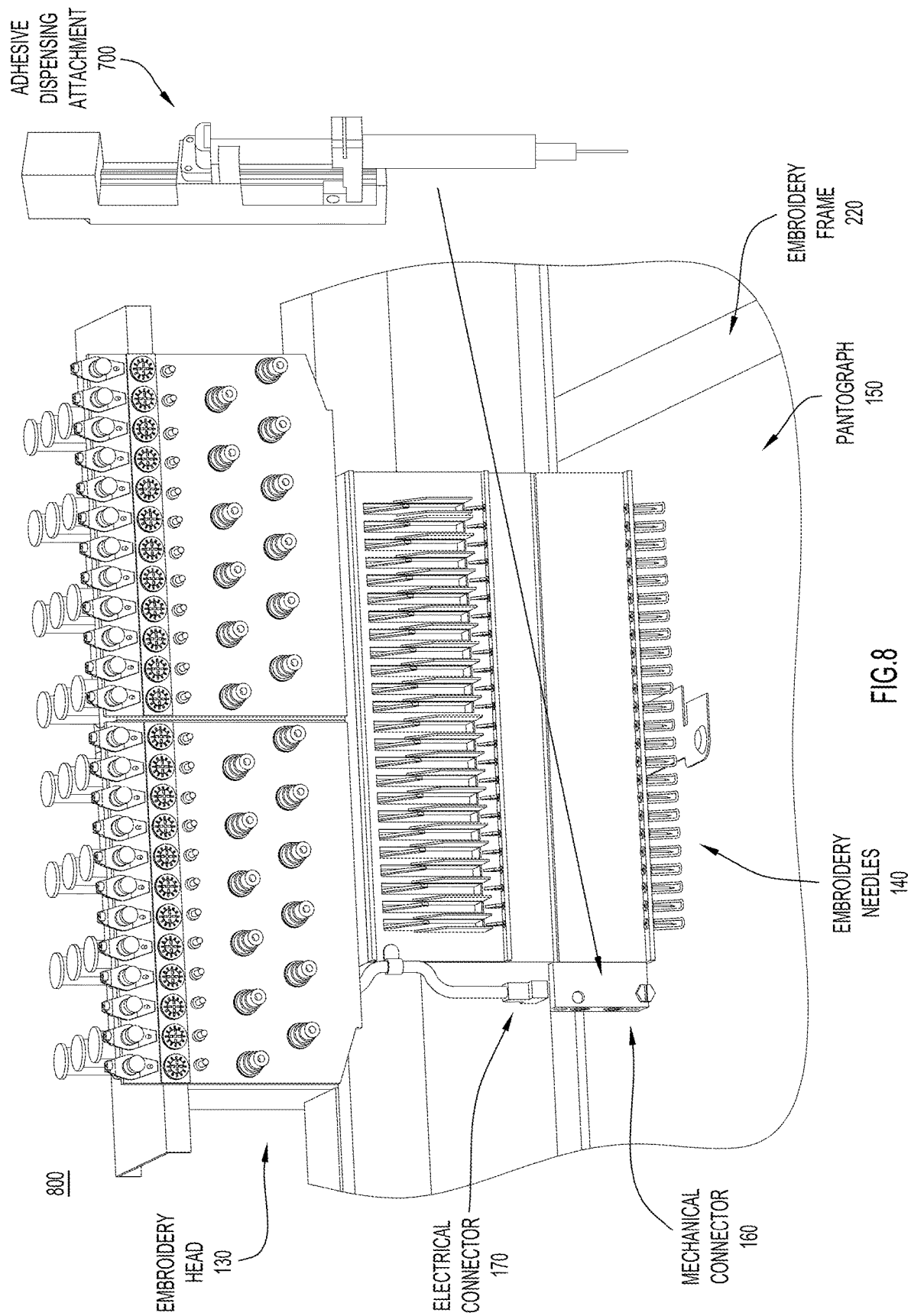
FIG. 8 illustrates a system including an adhesive dispensing attachment described herein that is integrated with an embroidery machine, according to an example embodiment.

FIG. 8 illustrates a system 800 including the adhesive dispensing attachment 700 integrated with the embroidery machine 120, according to an example embodiment. The adhesive dispensing attachment may be held in place by fastening the mechanical connector 160 to the mechanical mount on the adhesive dispensing attachment 700. The adhesive dispensing attachment 700 may obtain power and data from the embroidery machine 120 by coupling the electrical connector 170 to the electrical mount on the adhesive dispensing attachment 700.

Briefly, the adhesive dispensing attachment 700 may plug into the embroidery machine 120 to provide the embroidery machine 120 with the capability to lay down adhesive (e.g., paste, glue, etc.) at one or more controllable locations. In particular, the adhesive dispensing attachment 700 may enable controllable placement of paste during an embroidery process to allow for embroidery-based stitching of a rigid material to a non-rigid or flexible material (e.g., a technical textile).

In operation, the embroidery machine 120 may initiate a paste dispensing process by moving from a location of a stitching needle to a location of the adhesive dispensing attachment 700 (e.g., the first or last needle on the embroidery machine 120). After moving to the location of the adhesive dispensing attachment 700, the embroidery machine 120 may activate the adhesive dispensing attachment 700, prompting the height control motor 720 to lower the adhesive dispensing attachment 700 along the height control track 710 toward the fabric surface.

When the adhesive dispensing attachment 700 reaches the fabric surface, the pressure control motor 760 may drive the paste from the syringe 730, expelling the paste from the tip 770. In some examples, the tip 770 may dispel a small amount of paste onto a textile that is framed by the embroidery frame 220. In other examples, the tip 770 may dispel paste onto a circuit board or other rigid component that has already been fixed onto a fabric clamped to the embroidery machine 120 via the embroidery frame 220. While glue is dispensed from the tip 770 of the head of the adhesive dispensing attachment 700, the pantograph 150 may move on the table from location to location. Thus, a small amount of paste may be applied at specific locations or as a solid line between locations. This allows the paste to fill points, lines, or areas on the textile surface on the embroidery machine 120. In some examples, another part may be placed in the location where the glue was dispensed, and the glue may affix that part to the fabric.

When the paste dispensing/application process is finished, the controller module on the embroidery machine 120 may issue a command to lift the adhesive dispensing attachment 700 via the height control motor 720. The adhesive dispensing attachment 700 may retract from the surface of the fabric, potentially allowing for the embroidery machine 120 to make further embroidery stitches, if desired.

Two specific use cases are provided as follows, though it will be appreciated that the adhesive dispensing attachment 700 may be used for any suitable application. In the first use case, the adhesive dispensing attachment 700 applies paste (e.g., glue) to the inside of a textile during the embroidery process to temporarily glue or fix one or more circuit boards to a fabric. After temporarily gluing or fixing the circuit boards, the embroidery machine 120 may stitch the circuit boards to the fabric. For instance, the embroidery machine 120 may trace the outline of a circuit board with stitches to create a visual guide for locational positioning to place the circuit board with the correct translation, rotation, and scaling. The adhesive dispensing attachment 700 may then apply glue to that position underneath the location of the circuit board, after which the embroidery machine 120 may place the circuit board onto the textile, with the glue quickly fixing the circuit board to the textile.

In a second use case, the adhesive dispensing attachment 700 may place solder paste on top of an already-embroidered circuit board. The solder paste may help fix electrical components (e.g., resistors, capacitors, inductors, integrated circuits, etc.) to the circuit board both mechanically and electrically. The paste dispensing may ensure high accuracy while eliminating a secondary machine and additional process for paste dispensing.

Figure 9:
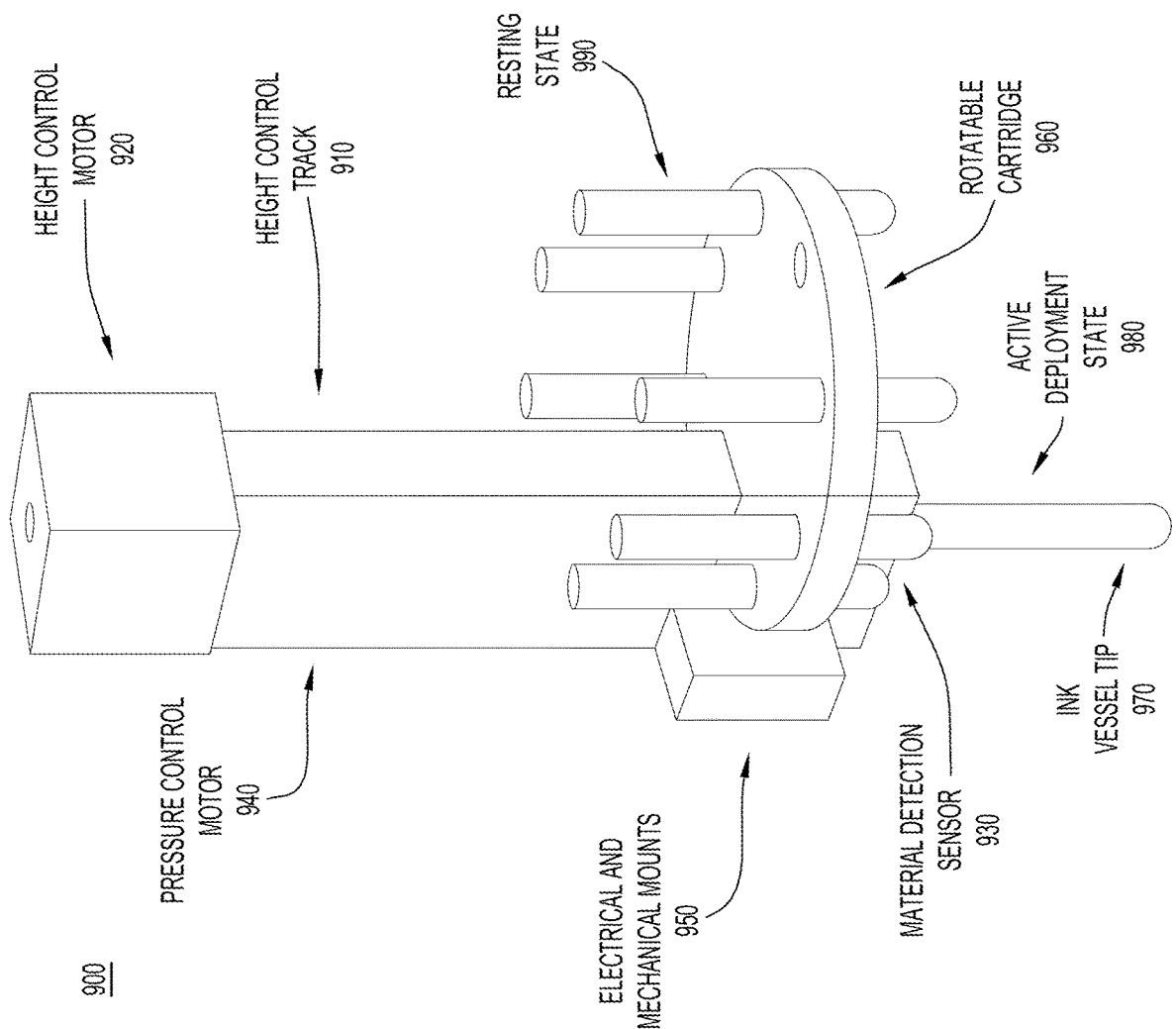
FIG. 9 illustrates an ink applicator attachment, according to an example embodiment.

FIG. 9 illustrates an ink applicator attachment 900, according to an example embodiment. The ink applicator attachment 900 includes a height control track 910 configured to support the ink applicator attachment 900 when it is raised or lowered, a height control motor 920 configured to raise and lower the ink applicator attachment 900 along the height control track 910, a material detection sensor (e.g., a pressure sensor) 930 configured to detect the distance to a fabric, a pressure control motor 940 configured to force extrusion of paste, gels, and/or liquids (e.g., ink) from the ink applicator attachment 900, and electrical and mechanical mounts 950 configured to secure the ink applicator attachment 900 to the embroidery machine 120.

The ink applicator attachment 900 further includes a rotatable cartridge 960 with a plurality of slots each configured to hold an ink vessel. Each ink vessel may include a tip (e.g., ink vessel tip 970) configured to deliver ink to a fabric or material. In this example, each tip is a liquid deposition component configured to deposit ink on one or more materials of a textile product.

It will be appreciated that the rotatable cartridge 960 may have any suitable number of slots, and that each slot may be configured to hold any suitable number of ink vessels. In this example, the ink vessels include inks of different colors. However, it will be appreciated that each ink vessels may include any suitable type/color/material of ink. For example, multiple ink vessels may include the same color, if desired.

As shown, one of the ink vessels may be in an active deployment state 980, while the remaining ink vessels may be in a resting state/position 990. In active deployment state 980, an ink vessel may be configured to expel ink. In resting state 990, an ink vessel may be configured to retain ink. The state of the ink vessels may be set by the configuration/position of the rotatable cartridge 960. While only one of the ink vessels is shown as being in the active deployment state 980, it will be appreciated that any suitable number of ink vessels may be in active deployment state 980 simultaneously. Furthermore, as shown, one of the slots is empty (i.e., the empty slot does not hold an ink vessel). Any suitable number of slots may be empty, and slots may be filled or left empty in any suitable arrangement.

Figure 10:
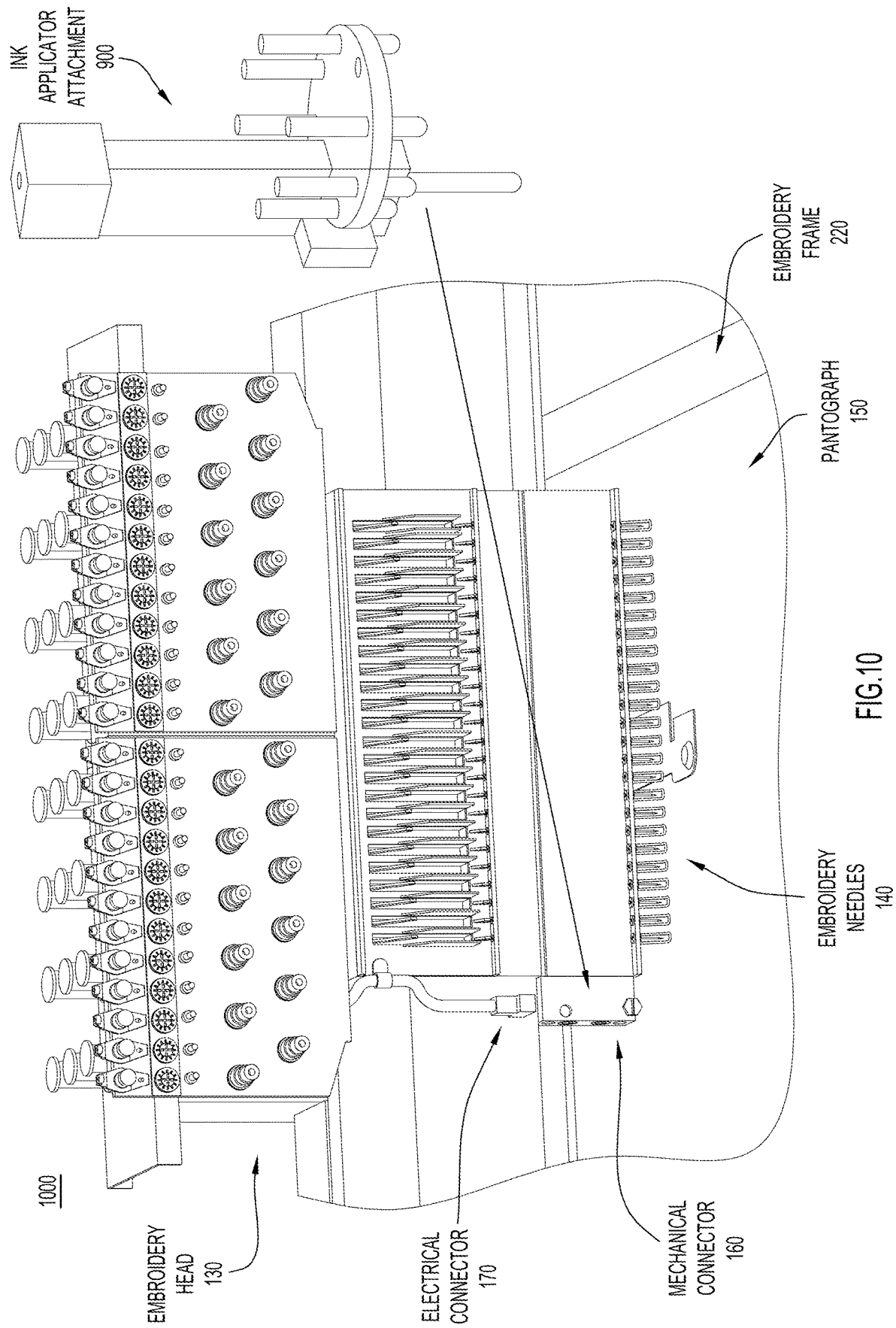
FIG. 10 illustrates a system including an ink applicator attachment described herein that is integrated with an embroidery machine, according to an example embodiment.

FIG. 10 illustrates a system 1000 including the ink applicator attachment 900 which is is integrated with the embroidery machine 120, according to an example embodiment. The ink applicator attachment 900 may be configured to interface with the mechanical connector 160 and the electrical connector 170. For example, the ink applicator attachment 900 may be held in place by fastening the mechanical connector 160 to the mechanical mount on the ink applicator attachment. The ink applicator attachment 900 may obtain power and data from the embroidery machine 120 by coupling the electrical connector 170 to the electrical mount on the ink applicator attachment 900.

The ink applicator attachment 900 may enable the embroidery machine 120 to rapidly draw on a piece of fabric using ink. In operation, the embroidery machine 120 may switch from a stitching needle to the first or last needle, where the ink applicator attachment 900 may be located (e.g., the ink applicator attachment 900 may be plugged into the first or last needle). After establishing a position at the location of the ink applicator attachment 900, the embroidery machine 120 may activate the ink applicator attachment 900. In particular, the embroidery machine 120 may lower the ink applicator attachment 900 to the fabric along the height control motor 920 via the height control track 910 until the material detection sensor 930 determines that the ink is touching the fabric.

Before, during, or after the lowering of the ink applicator attachment 900, the controller module of the embroidery machine 120 may automatically select/switch one of the ink vessels (e.g., pens, each holding an ink of a different color) that was preloaded onto the rotatable cartridge 960. Alternatively, an ink vessel may be manually selected.

Once the ink vessel (e.g., color) is selected and the ink applicator attachment 900 has been fully lowered, the pantograph 150 may begin to move, allowing for the ink vessel to controllably disperse ink over the fabric. In particular, the pressure control motor 940 may control when the ink vessel expels the ink, as well as how much ink is dispelled. The ink applicator attachment 900 may remain stationary in space while the embroidery frame 220 moves beneath the ink applicator attachment 900, thereby creating the designs/markings.

When a new color is desired, the ink applicator attachment 900 may retract, switch to the new color (e.g., by revolving the rotatable cartridge 960), and then approach the fabric, stopping when the material detection sensor 930 determines that the ink vessel is in contact with the fabric. The embroidery machine 120 may proceed with inking the next color in the design to the fabric. This process may be repeated as desired to create different shapes/design with multiple colors. When the ink applicator attachment 900 is finished applying ink to the surface of the fabric, it may fully retract and await any further commands from the embroidery machine 120 (e.g., to re-activate the ink applicator attachment).

In another example, a peristaltic pump may apply the ink through a tube that directs ink down to the surface of the textile. In a further example, multiple peristaltic motors may apply respective ink colors through a pump to a manifold that collects and dispenses the ink directly on the fabric in the embroidery machine 120. Thus, ink colors may be swapped using different peristaltic motors.

Three specific use cases are provided as follows, though it will be appreciated that the ink applicator attachment 900 may be used for any suitable application. In the first use case, the ink may indicate areas on the fabric that have had or will have secondary processes such as cutting, taping, welding, or hand-sewing. That is, the ink may demarcate specific technical locations for operators (e.g., locations for cutting the fabric at some later time, locations for placing glue, and other critical locations).

In the second use case, the ink applicator attachment 900 may create improved visual designs/effects. In one example, the ink may be used as markers around a design so that objects (e.g., cut-out patterns) may be easily located by eye. In another example, consider a white fabric that is strapped into the frame of an embroidery machine 120. Using the ink applicator attachment 900, the embroidery machine 120 may selectively cover the white fabric, filling the star-shaped region with red ink. Optionally, once the red ink has been applied, the star region may be stitched over with red embroidery thread to provide a deeper color and less color contrast. If the star-shaped region/area on the fabric was filled/covered with red stitching thread using traditional embroidery techniques without first applying the red ink, some of the white base fabric might show through the red stitches to the front of the fabric, creating an undesired visual effect. Thus, the ink applicator attachment 900 may reduce/eliminate undesirable visual effects in traditional embroidery. Furthermore, the embroidery machine 120 may apply the ink using the ink applicator attachment 900 faster than the embroidery machine 120 can stitch markings.

In the third use case, the embroidery machine 120 may use the ink applicator attachment 900 to avoid stitching markings in regions where it would be preferable not to puncture the material. For example, some watertight fabrics may use markings but cannot have holes. The embroidery machine 120 may indicated details or other construction markings on textiles using the ink applicator attachment 900 without creating holes. Although the embroidery machine 120 could stitch markers with bright thread, this would create a hole in the fabric with an embroidery needle and stitching thread; the embroidery machine 120 may to ink regions on the fabric to generate a visual marker without creating holes. Furthermore, the ink applicator attachment 900 may rapidly trace the outlines of different designs on top of a fabric faster than a traditional embroidery stitching process. The embroidery machine 120 may apply ink using the ink applicator attachment 900 before, during and/or after the embroidery process while the fabric is on the embroidery machine.

Figure 11:
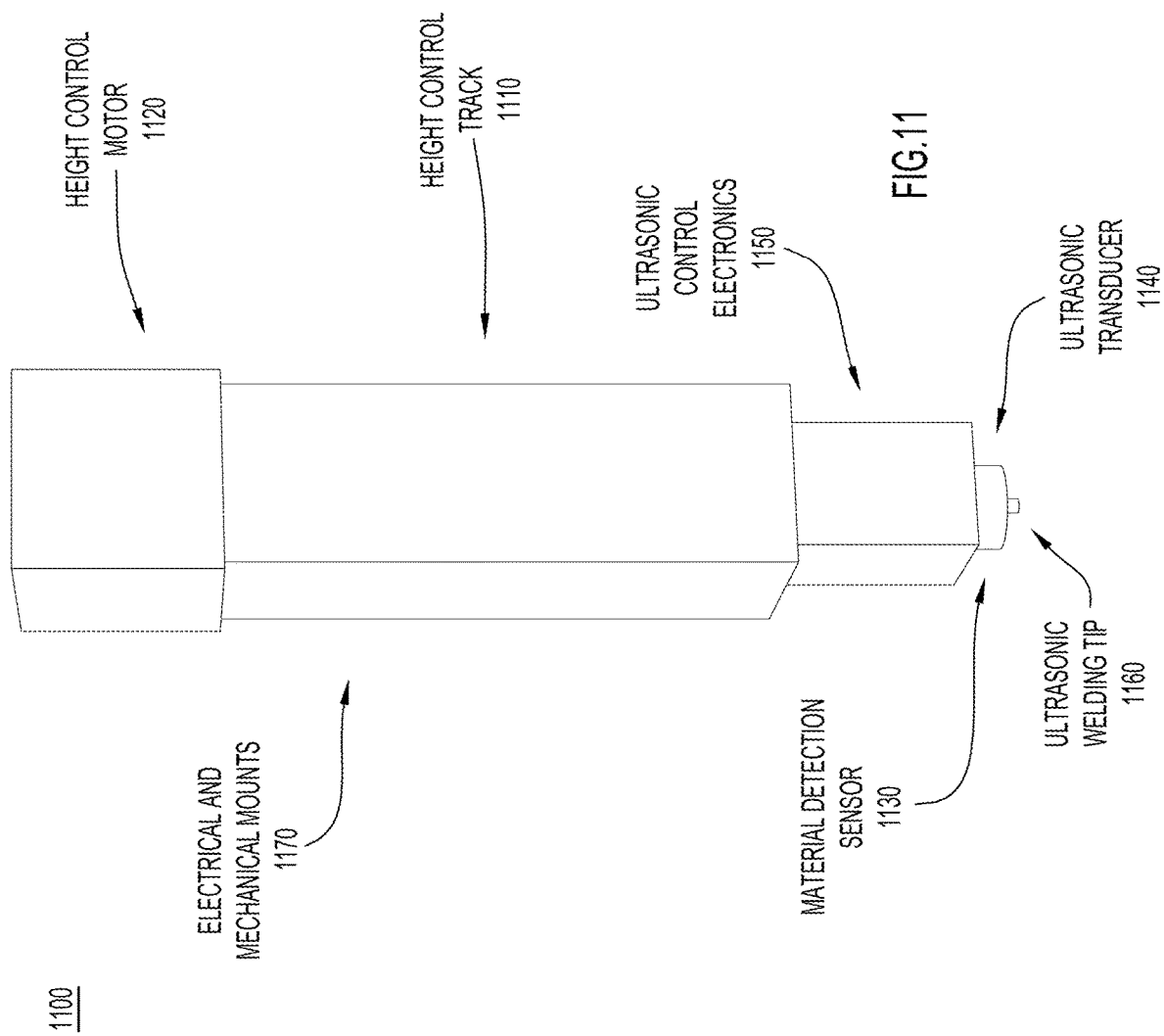
FIG. 11 illustrates an ultrasonic head attachment, according to an example embodiment.

FIG. 11 illustrates an ultrasonic head attachment 1100, according to an example embodiment. The ultrasonic head attachment 1100 includes a height control track 1110, a height control motor 1120 configured to raise and lower the ultrasonic head attachment 1100 along the height control track 1110, a material detection sensor 1130 configured to detect the top of a material (e.g., fabric), an ultrasonic transducer 1140 configured to generate ultrasonic waves, ultrasonic control electronics 1150 configured to control the ultrasonic transducer 1140, an ultrasonic welding tip 1160 configured to emit ultrasonic waves toward at least one component of the textile product and weld materials, and electrical and mechanical mounts 1170 configured to secure the paste dispensing attachment to an embroidery machine.

Figure 12:
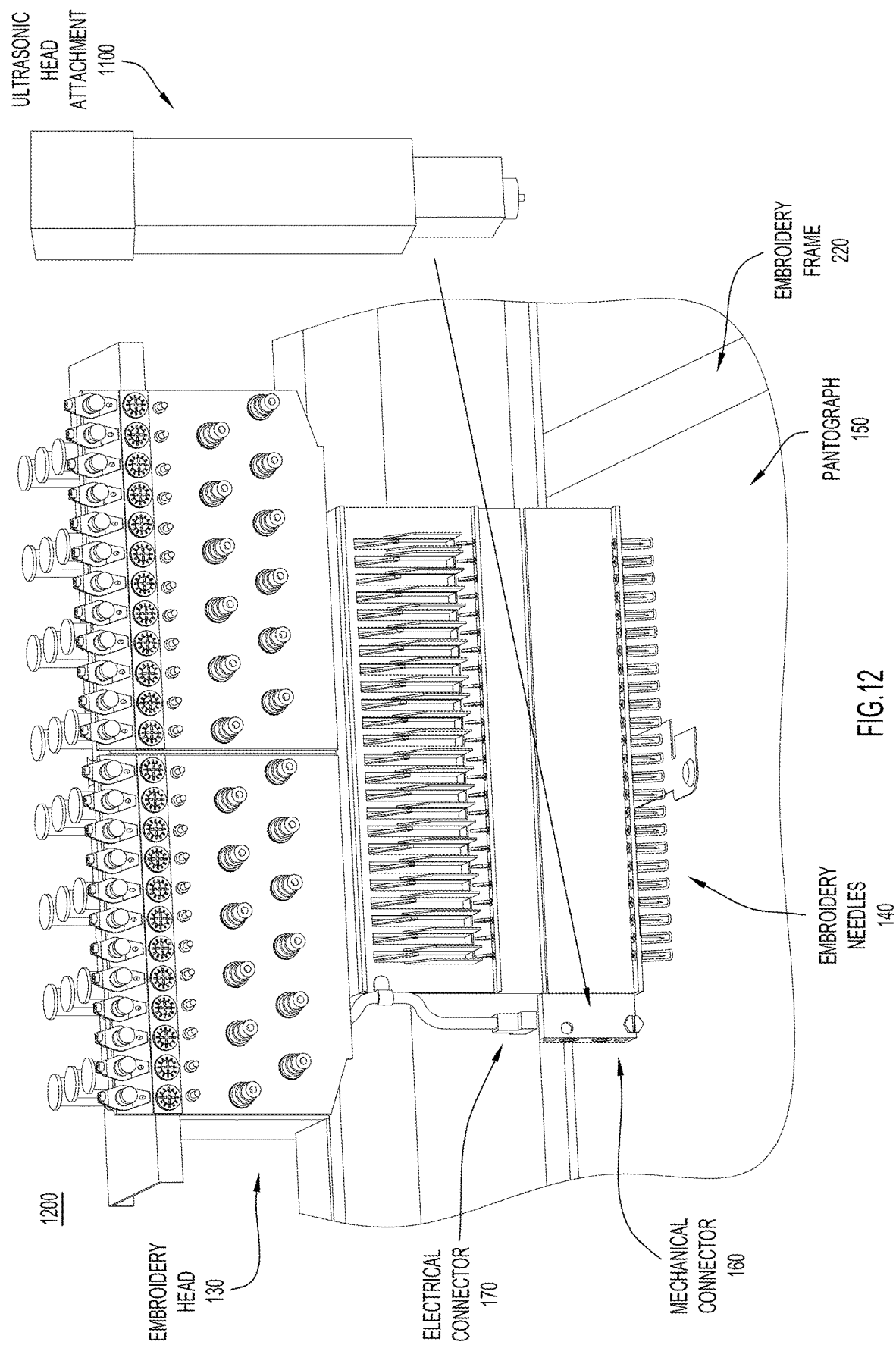
FIG. 12 illustrates a system including an ultrasonic head attachment described herein that is integrated with an embroidery machine, according to an example embodiment.

FIG. 12 illustrates a system 1200 including the ultrasonic head attachment 1100 integrated with the embroidery machine 120, according to an example embodiment. The ultrasonic head attachment 1100 may be held in place by fastening the mechanical connector 160 to the mechanical mount on the ultrasonic head attachment 1100. The ultrasonic head attachment 1100 may obtain power and data from the embroidery machine 120 by coupling the electrical connector 170 to the electrical mount on the ultrasonic head attachment.

Although the embroidery machine 120 allows for large flat areas of flexible material to be bound together using thread, existing stitching techniques (e.g., stitching with polyester or other thread) cannot adequately fuse two materials together in a way that does not leave holes in the fabric. In certain technical textiles, these holes are undesired.

Accordingly, the ultrasonic head attachment 1100 may be configured to plug into the embroidery machine 120 and augment the embroidery machine 120 with the capability to weld, press, or fuse together two or more materials in technical textiles using ultrasonic energy. The materials may be similar or dissimilar in composition and construction. The ability to fuse two different materials together on the embroidery machine 120 may provide advantages in construction. This ultrasonic process may eliminate unwanted holes in the fabric or material that would otherwise result from standard embroidery stitching processes via the embroidery needles and stitching thread.

In operation, the embroidery machine 120 may shift from the active stitching needle to the first or last needle locations, which may correspond to the location of the ultrasonic head attachment 1100. After identifying the correct location, the embroidery machine 120 may activate the ultrasonic head attachment 1100. The embroidery machine 120 may command the height control motor 1120 to lower the ultrasonic head attachment 1100 toward the surface of the embroidery fabric.

The material detection sensor 1130 may determine the distance between the ultrasonic head attachment 1100 and the fabric. Based on data obtained from the material detection sensor 1130, the embroidery machine 120 may align the ultrasonic head attachment 1100 to gently touch the fabric, thereby ensuring proper z-height positioning. In particular, the ultrasonic transducer 1140 may be positioned at the base of the ultrasonic head attachment 1100, directly facing/contacting the fabric.

Once the ultrasonic head attachment 1100 is properly positioned, the controller module of the embroidery machine 120 may send a signal to the ultrasonic head attachment 1100 to activate the ultrasonic transducer 1140. When activated, the ultrasonic transducer 1140 may deposit energy into the fabric or material at the location of the ultrasonic head attachment 1100 relative to the embroidery frame 220. The deposited energy may melt the fabric and fuse it to an adjacent material, such as a material that has been placed on the fabric.

Any suitable waveform and/or frequency may be emitted by the ultrasonic transducer 1140 to melt or fuse different materials or constructions. To create different designs (e.g., different sizes and/or shapes), the embroidery machine 120 may move the embroidery frame 220 underneath the ultrasonic head attachment 1100, which may maintain a fixed position. Thus, the ultrasonic head attachment 1100 may help construct complex designs/shapes and perform cuts.

When the ultrasonic head attachment process is finished, the embroidery machine 120 may send a signal from the controller module to retract the ultrasonic head attachment 1100 along the height control track 1110 and continue with any other suitable stitching process, if desired. In one example, the ultrasonic head attachment 1100 may include a backup activation and/or retraction switch for emergency activation and/or release.

The ultrasonic head attachment 1100 may accelerate traditional embroidered stitching processes. For regions that do not require high-strength stitching, the embroidery machine 120 may use the ultrasonic head attachment 1100 to rapidly join two materials at a given location. The embroidery machine 120 may switch back to an embroidery process—which is slower—for locations requiring more mechanical support. That is, the embroidery machine 120 may stitch regions of the fabric that do not need to be airtight with high-strength, high-reliability thread, while fusing other regions in the fabric using the ultrasonic head attachment 1100 to create an airtight seal. This process may be performed on a single machine (e.g., the embroidery machine 120).

Two specific use cases are provided as follows, though it will be appreciated that the ultrasonic head attachment 1100 may be used for any suitable application. In the first use case, the ultrasonic head attachment 1100 may be used to create inflatable boats (e.g., inflatable kayaks). In a typical embroidery process, the embroidery machine 120 would create the inflatable boat by stitching two fabrics or materials together, as stitching provides high mechanical support; however, these stitches can also create holes in the fabric, resulting in a pervious/permeable membrane. The ultrasonic head attachment 1100 may seal these holes, creating a connection and seam that is both mechanical and airtight in goods such as inflatable kayaks.

In the second use case, the embroidery machine 120 may use the ultrasonic head attachment 1100 to generate a logo on a fabric. Consider a scenario in which the embroidery machine 120 stitches the logo into the fabric with a thermoplastic thread. In that case, the embroidery machine 120 may activate the ultrasonic head attachment 1100, causing the ultrasonic head attachment 1100 to seal stitch holes in the threaded area. More specifically, the ultrasonic head attachment 1100 may melt the thread, fusing it into the stitch holes in the carrier fabric. This may eliminate the stitch holes while maintaining the visual acuity of the embroidered logo.

Figure 13:
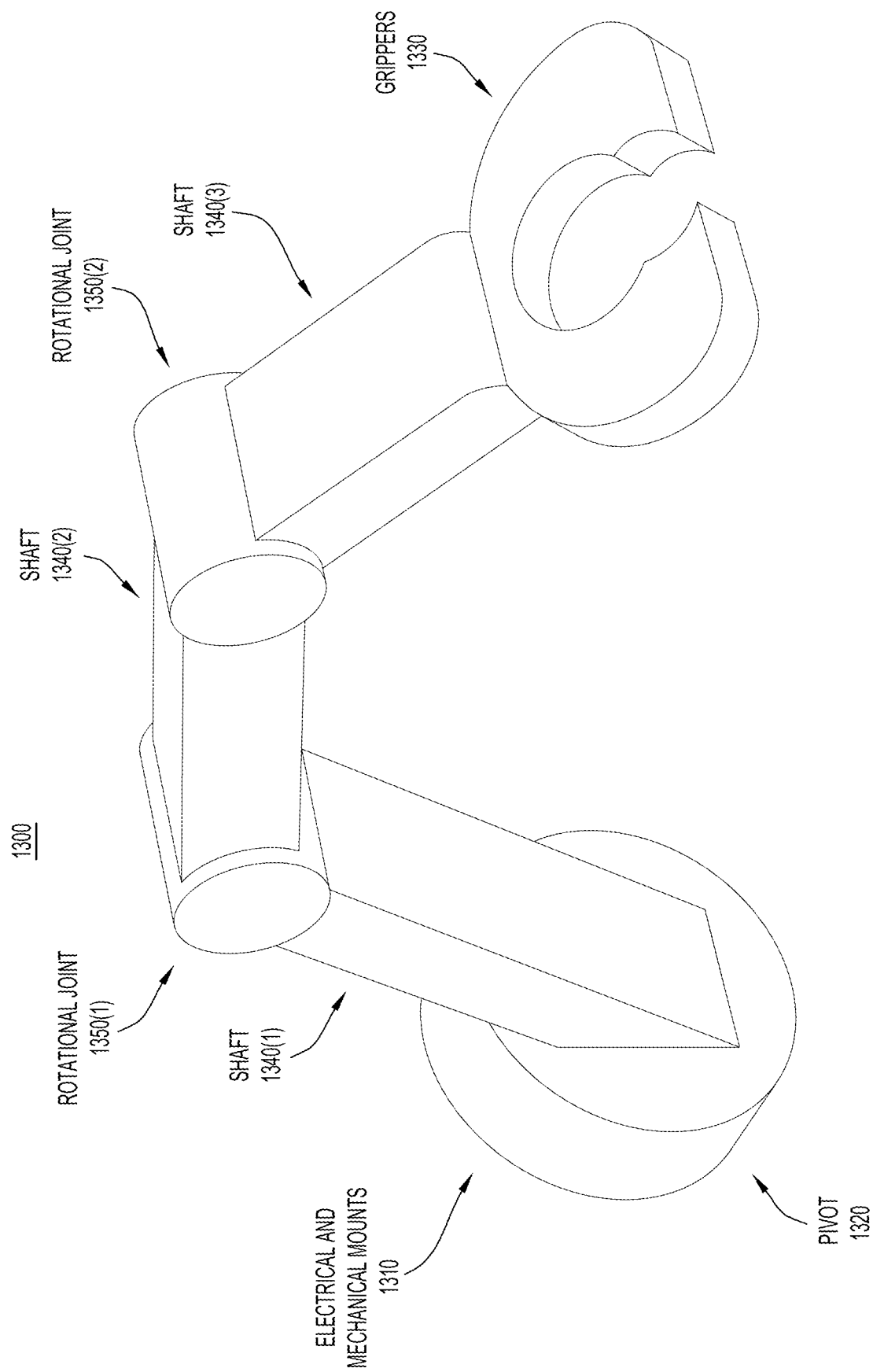
FIG. 13 illustrates a relocation attachment, according to an example embodiment.

FIG. 13 illustrates a relocation attachment 1300 configured to relocate at least one component or by-product of the textile product in relation to an additive textile manufacturing machine, according to an example embodiment. The relocation attachment 1300 includes electrical and mechanical mounts 1310 configured to secure the relocation attachment to an embroidery machine, a pivot 1320 configured to enable the relocation attachment to swivel, grippers 1330 configured to remove parts from an embroidery fabric, shafts 1340(1)-1340(3) configured to connect the grippers 1330 to the pivot 1320, and rotational joints 1350(1) and 1350(2) configured to connect and angle the shafts 1340(1)-1340(3). In one example, the relocation attachment 1300 may be configured as a robotic arm.

The relocation attachment 1300 includes one pivot (i.e., pivot 1320), two rotational joints (i.e., rotational joints 1350(1) and 1350(2)), and three shafts (i.e., shafts 1340(1)-1340(3)). However, in general, a relocation attachment in accordance with techniques described herein may include any suitable number of pivots, shafts, and/or rotational joints. Furthermore, the rotational joints and/or pivots may be configured with any suitable number and type(s) of degrees of freedom. For example, the rotational joints and/or pivots may be configured to rotate about any suitable axis or axes. In addition, while the grippers 1330 are illustrated as having two pincers configured to pinch a removable part, in general a gripper may have any suitable number of pincers or any other suitable mechanism configured to secure a removable part.

Figure 14:
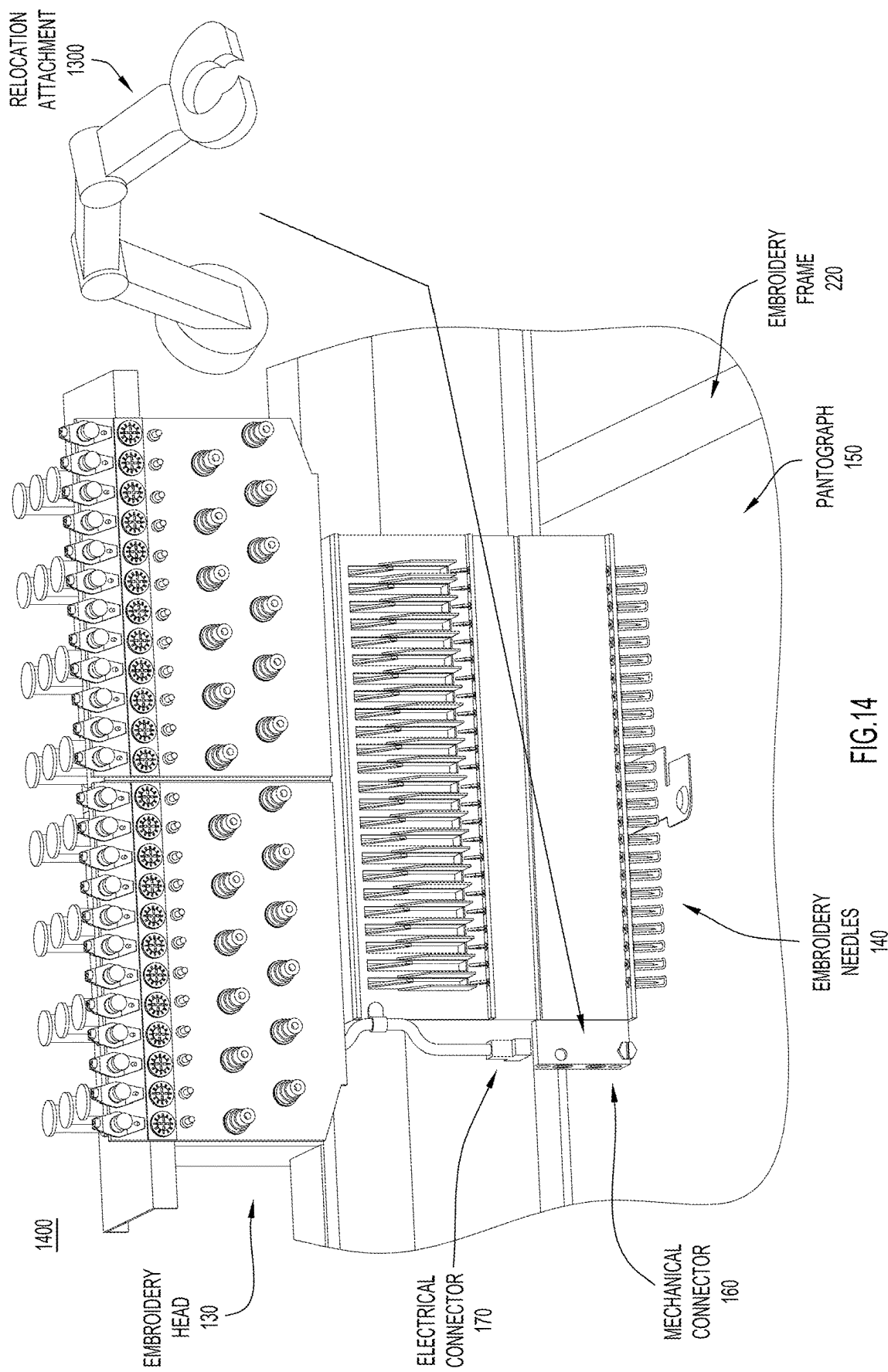
FIG. 14 illustrates a system including a relocation attachment described herein that is integrated with an embroidery machine, according to an example embodiment.

FIG. 14 illustrates a system 1400 including the relocation attachment 1300 which is integrated with the embroidery machine 120, according to an example embodiment. The relocation attachment 1300 may be configured to interface with the mechanical connector 160 and the electrical connector 170. For example, the relocation attachment 1300 may be held in place by fastening the mechanical connector 160 to the mechanical mount on the relocation attachment 1300. The relocation attachment 1300 may obtain power and data from the embroidery machine 120 by coupling the electrical connector 170 to the electrical mount on the relocation attachment 1300.

The relocation attachment 1300 may be a nimble system configured to extract parts directly off the fabric, table, and/or embroidery machine 120, and place the parts into packaging. The parts may, for example, be embroidered patches that were cut out from a fabric on the embroidery machine 120 using any suitable cutting technique such as laser cutting or hot-air cutting. The relocation attachment 1300 may remove cut parts from the pantograph 150 before moving on to a subsequent embroidery step or part, to prevent the cut part from shifting in the embroidery frame 220 and potentially damaging the embroidery machine 120 and/or destroying the cut part. Thus, the relocation attachment 1300 may remove cut parts from the fabric before the fabric is removed from the embroidery machine 120 or new parts are manufactured from the fabric.

Unlike conventional approaches, in which the embroidery machine 120 would pause for an operator to manually removed the parts—a time-consuming and laborious process, particularly for mass-manufactured embroidered goods—the relocation attachment 1300 may automatically and quickly remove cut parts. More specifically, the relocation attachment 1300 may assist the embroidery machine 120 in removing cut parts while the embroidery process commences with the next embroidery steps, allowing for greater efficiency and automation technologies (e.g., roll-to-roll functionality). The relocation attachment 1300 may provide faster part removal, more machine running time, and automated parts collection, counting, and packaging.

The relocation attachment 1300 may also/alternatively be configured to rapidly place parts from a palletized tray onto a fabric for stitching by the embroidery machine 120. The parts may include rigid or non-rigid mechanical parts such as fasteners or other components. The relocation attachment 1300 may automatically place the parts with high precision and accuracy, positioning additional components while the relative positions between the relocation attachment 1300 and the fabric remain constant.

In operation, the relocation attachment 1300 is mechanically and electrically connected to the embroidery machine 120. After embroidering, finishing, and cutting a part (e.g., a patch), the embroidery machine 120 may send a command from the controller module to the relocation attachment 1300. In response to the command, the relocation attachment 1300 may locate the part using the location known by the embroidery machine 120 and/or embroidery frame 220. In one example, the embroidery machine 120 may also include a camera to help automatically locate parts that have been finished in the embroidery design.

The relocation attachment 1300 may orient itself above the part and move the grippers 1330 into an open position, if the grippers 1330 are not already in an open position. The relocation attachment 1300 may lower the grippers 1330 toward the table and close the grippers 1330 around the part on the table. The relocation attachment 1300 may lift the part from the table, freeing the part from any residual embroidery. The relocation attachment 1300 may place the part into packaging and return the grippers 1330 to an open position, dropping the part into the packaging. The relocation attachment 1300 may prepare to remove another part, for example, by returning to a neutral/default position/orientation.

Additionally/alternatively, the relocation attachment 1300 may place rigid or flexible parts (e.g., circuit boards, inserts, fasteners, metal components, etc.) onto the embroidery table in predefined locations. For example, the embroidery machine 120 may signal a stop command to stop embroidering. The embroidery machine 120 may move the embroidery frame 220 into a position such that the relocation attachment 1300 can reach the part. The relocation attachment 1300 may orient itself above the part and move the grippers 1330 into an open position, if the grippers 1330 are not already in an open position. The relocation attachment 1300 may lower the grippers 1330 toward the part and close the grippers 1330 around the part in the palletized tray. The relocation attachment 1300 may lift the part from the palletized tray and place the part onto the pantograph 150. The relocation attachment 1300 may return the grippers 1330 to an open position, dropping the part onto a precise location of the pantograph 150 and in a specific orientation. Once the relocation attachment 1300 has placed the part in the correct position, the embroidery machine 120 may be reactivated. More specifically, the embroidery machine 120 may move the pantograph 150 and stitch the part down using an embroidery needle and stitching thread. At the end of the embroidery process (e.g., after the part has been embroidered/stitched down to the fabric), the relocation attachment 1300 may reach down toward the embroidered part, use the grippers 1330 to grab onto the part, remove the part from the embroidery machine 120, and place the part into packaging.

Thus, the relocation attachment 1300 may be configured to perform part addition operations as well as part removal operations. The part removal operations may cause the relocation attachment 1300 to remove parts (e.g., patches and/or other embroidered pieces) from the fabric, which may be clamped to the embroidery frame 220 on the table (e.g., pantograph 150) of the embroidery machine 120. The relocation attachment 1300 may count the parts and place them into packaging as the embroidery machine 120 may continue operating.

The part addition operations may cause the relocation attachment 1300 to precisely place circuit boards, fasteners, or other hardware onto the fabric on the table for stitching. After the embroidery machine 120 has carried out the stitching process, the relocation attachment 1300 may perform further part removal operations. For example, the relocation attachment 1300 may remove the part from the embroidery machine table, robotically count it, and robotically place it into packaging.

Figure 15:
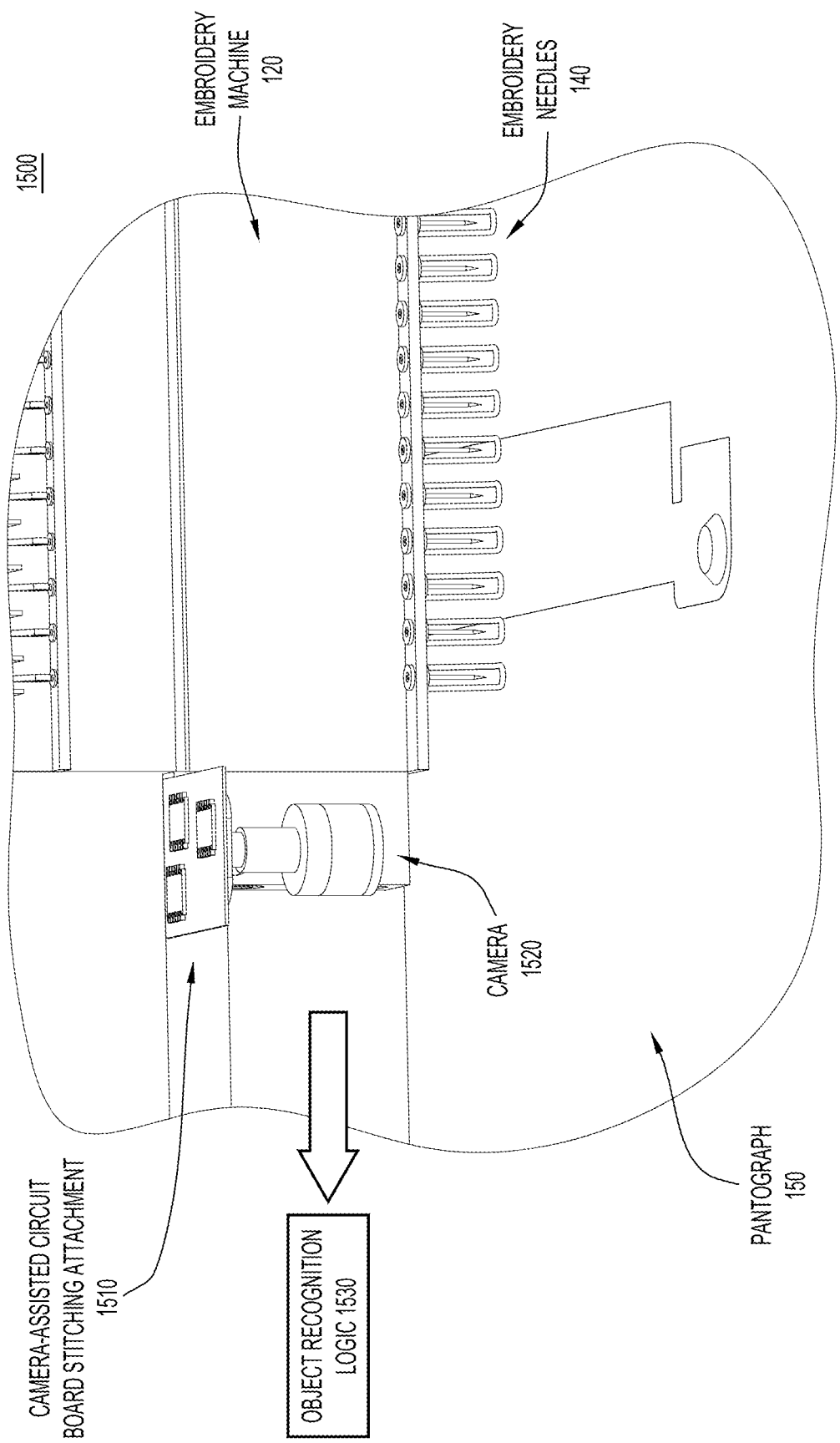
FIG. 15 illustrates a system including a camera-assisted circuit board stitching attachment described herein that is integrated with an embroidery machine, according to an example embodiment.

FIG. 15 illustrates a system 1500 including a camera-assisted circuit board stitching attachment 1510 that is integrated with the embroidery machine 120, according to an example embodiment. The camera-assisted circuit board stitching attachment 1510 includes a camera 1520 pointing down at the fabric of the embroidery machine 120, and object recognition logic 1530. In one example, the object recognition logic 1530 may be Artificial Intelligence (AI) software that is stored in a computer.

The camera-assisted circuit board stitching attachment 1510 may be configured to interface with the mechanical connector 160 and the electrical connector 170. For example, the camera-assisted circuit board stitching attachment 1510 may be held in place by fastening the mechanical connector 160 to a mechanical mount on the camera-assisted circuit board stitching attachment 1510. The camera-assisted circuit board stitching attachment 1510 may obtain power and data from the embroidery machine 120 by coupling the electrical connector 170 to an electrical mount on the camera-assisted circuit board stitching attachment 1510.

Briefly, the camera-assisted circuit board stitching attachment 1510 may use an imaging device, such as camera 1520, to detect a positioning of a circuit board relative to at least one component of a textile product (e.g., a circuit board). In response to detecting the positioning of the circuit board, the camera-assisted circuit board stitching attachment 1510 may integrate the circuit board with the at least one component of the textile product.

In one example, the camera-assisted circuit board stitching attachment 1510 may locate holes on a circuit board. This may allow the circuit board to be rapidly—and with potentially low accuracy—placed on the embroidery machine 120. The embroidery machine 120 may automatically adapt to and correct for any location and placement errors based on visual data obtained by the camera 1520. Using the camera 1520 for alignment in circuit board stitching, the embroidery machine 120 may use an automated process that does not necessarily involve initially placing the circuit board at high accuracy. The camera-assisted circuit board stitching attachment 1510 may enable improved automation and production in embroidery and in bordering electronic circuit boards.

In operation, the camera 1520 may quickly scan a path along the fabric surface for specialized features such as the locations of circuit boards or features of circuit boards. The camera 1520 may generate visual data (e.g., a sequence of pictures and/or a video feed) and provide the data to a computer that stores the object recognition logic 1530. The object recognition logic 1530 may include AI software configured to obtain and analyze the visual data to identify the positioning of the circuit board. The object recognition logic 1530 may be trained to identify holes in the circuit board, or may identify the positioning using a QR code printed on the circuit board or any other suitable mechanism.

The computer may provide the results of the analysis to the embroidery machine 120. In one example, based on the results, the embroidery machine 120 may rotate and/or translate an embroidery design such that the design is aligned/oriented with the holes in the circuit board, and stitch down the circuit board. Thus, the embroidery machine 120 may stitch circuit boards using an optical positioning system. To further increase automation, if there are multiple circuit boards and/or embroidery designs, the embroidery machine 120 may perform a quick alignment check to ensure that none of the designs will overlap or run into each other.

In another example, the camera-assisted circuit board stitching attachment 1510 may inspect solder with an imaging device (e.g., camera 1520). For instance, the solder may be deposited by the welding attachment 210 (FIGS. 2 and 3). Based on inspecting the solder, the camera-assisted circuit board stitching attachment 1510 may prompt additional solder to be deposited (e.g., via the welding attachment 210) on one or more materials of the textile product. Thus, the camera 1520 may be used to inspect solder joints and the object recognition logic 1530 may analyze whether the joint is sufficient. If the joint is not sufficient, the object recognition logic 1530 may send a command to re-solder the joint.

After the embroidery machine 120 locates the circuit board, the camera 1520 may scan smaller holes in the board which are used to create electrical and mechanical connections. This quick scan may permit the embroidery machine 120 to standardize locations and better stitch the circuit boards using the camera system to reduce any inaccuracies in the system due to placement. Additionally, the embroidery machine 120 may quickly compensate for (e.g., remove) any vibrations in the system or motions that would move the circuit boards based on observation of the camera system in three-dimensional space.

Figure 16:
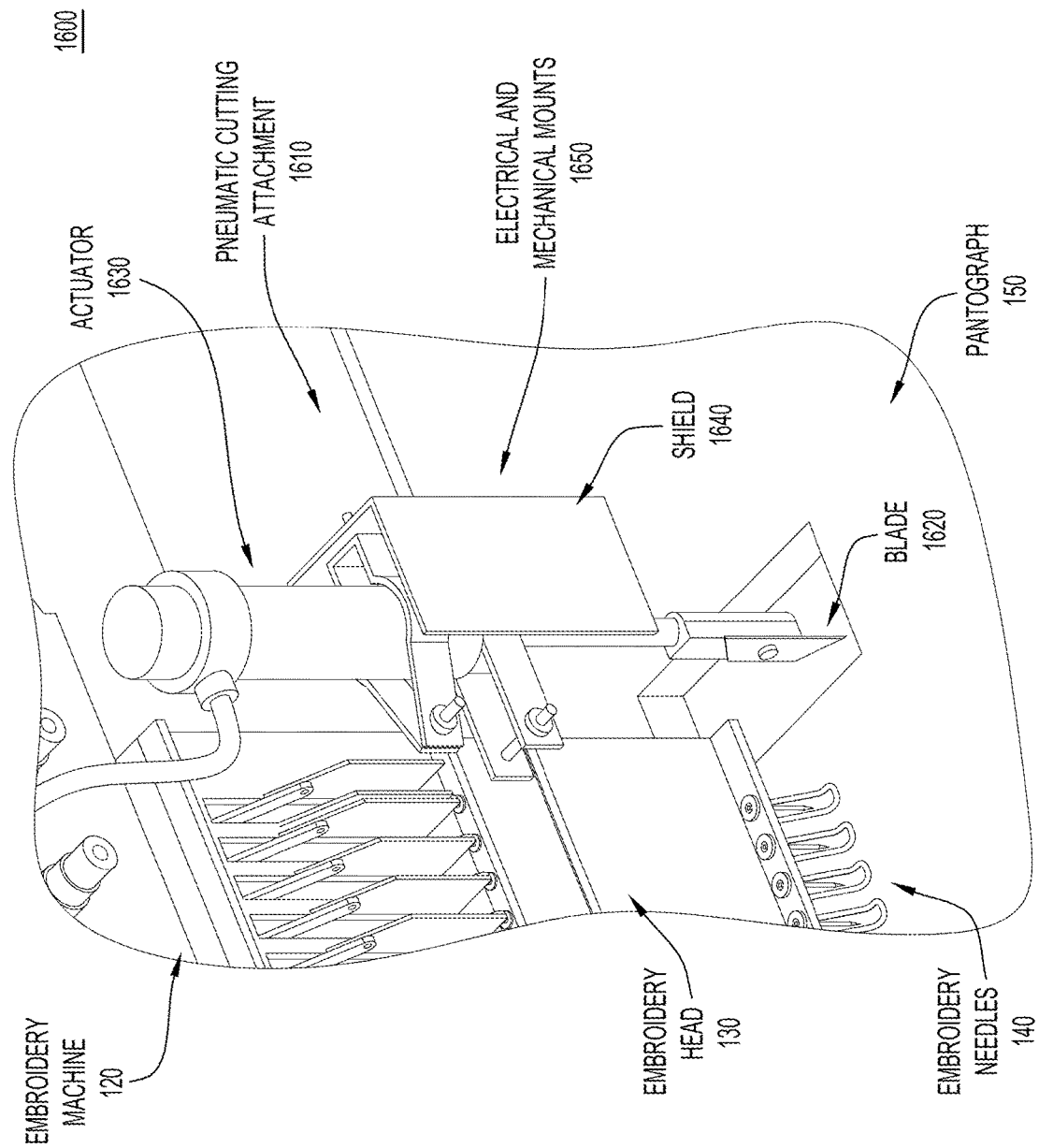
FIGS. 16 and 17 illustrate a system including a pneumatic cutting attachment described herein that is integrated with an embroidery machine, according to an example embodiment.
Figure 17:
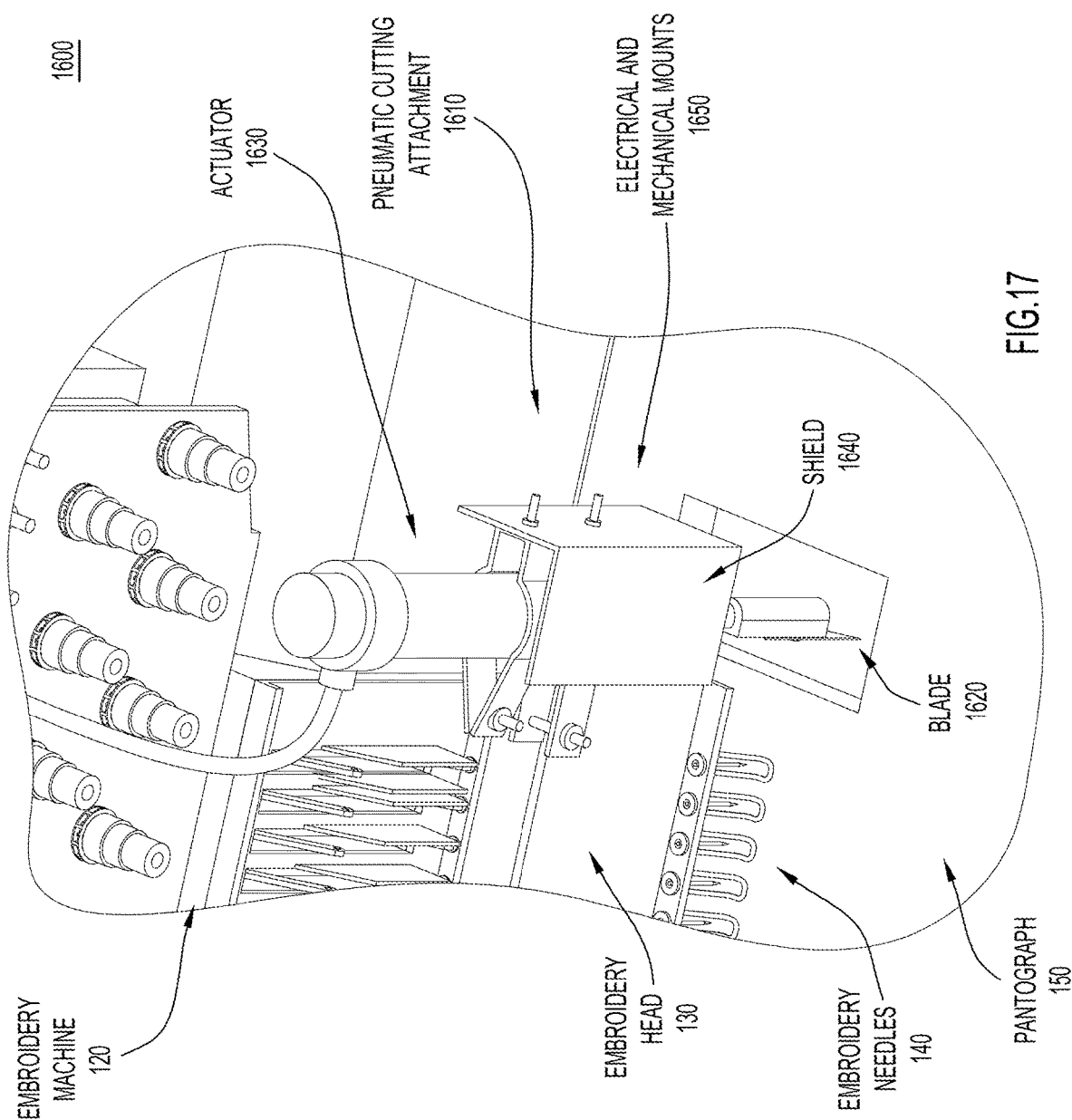

FIGS. 16 and 17 illustrate a system 1600 including a pneumatic cutting attachment 1610 that is integrated with the embroidery machine 120, according to an example embodiment. The pneumatic cutting attachment 1610 includes a fixed or rotatable blade 1620 configured to cut a fabric, an actuator 1630 configured to drive the blade, a shield 1640 configured to provide protection from the blade (e.g., knife edge), and electrical and mechanical mounts 1650 configured to secure the pneumatic cutting attachment 1610 to an embroidery machine 120.

The pneumatic cutting attachment 1610 may be configured to interface with the mechanical connector 160 and the electrical connector 170. For example, the pneumatic cutting attachment 1610 may be held in place by fastening the mechanical connector 160 to the mechanical mount on the pneumatic cutting attachment 1610. The pneumatic cutting attachment 1610 may obtain power and data from the embroidery machine 120 by coupling the electrical connector 170 to the electrical mount on the pneumatic cutting attachment 1610.

The pneumatic cutting attachment 1610 may function as a punch press configured to rapidly cut out finished embroidery parts/pieces (e.g., patches) from a fabric on the embroidery machine 120 automatically. Conventionally, finished embroidery parts would be cut out manually, utilizing secondary processes such as punch presses, laser cutting, or hot air cutting. The pneumatic cutting attachment 1610 may enable a faster and higher-quality edge cutting process than conventional methods such as hot air cutting. Furthermore, the pneumatic cutting attachment 1610 may reduce/remove secondary, manually-intensive processes.

In operation, after finishing the embroidering, the embroidery machine 120 may send a signal to move the pantograph 150 to the desired location. The desired location may be a location such that the pneumatic cutting attachment 1610, when activated, will cut out the target part. The embroidery machine 120 may send, to the pneumatic cutting attachment 1610 via the electrical connector 170, directions to perform the cut. Thus, the embroidery machine 120 may electrically activate the pneumatic cutting attachment 1610 to press out the embroidered part. Because the pneumatic cutting attachment 1610 is directly mechanically connected to the embroidery machine 120, the embroidery machine 120 may use its positioning system to mechanically locate the part to be cut. As a result, the pneumatic cutting attachment 1610 may be highly accurate because the pantograph 150 already accurately holds the embroidered fabric in the embroidery machine 120.

The pneumatic cutting attachment 1610 may be used for any suitable purpose, such as cutting slits in a fabric, cutting out square pieces of fabric, cutting out finished pieces of square patches, etc. Moreover, the pneumatic cutting attachment 1610 may hold dyes of any suitable size. The dyes may be manually or automatically placed into the embroidery machine 120. Furthermore, while the actuator 1630 is pneumatic in the example of FIGS. 16 and 17, it will be appreciated that any suitable actuator may be utilized to drive the cutting. For example, the actuator may be pneumatic, electric, motor, etc. Any suitable cutting attachment may, in accordance with techniques described herein, cut at least one component or by-product of a textile product using a blade (e.g., blade 1620).

Another attachment provided herein is a cord assembly placement frame attachment configured to integrate a cord assembly with at least one component of a textile product. For instance, the cord assembly placement frame attachment may help embroider a finished/completed cord/cable assembly to a fabric or material. One example of a finished cord assembly may be a Universal Serial Bus (USB) cord with connectors on both ends. The cord assembly placement frame attachment may automate the process of embroidering finished cord assemblies (e.g., including connectors and other assembly parts) onto a fabric. The cord assembly placement frame attachment may simplify the process of placing cords into the fabric, automate the placement for improved reliability, and allow placement during an embroidery process.

Typically, existing techniques (e.g., traditional wire embroidery practices, wire laying devices, and cording devices) cannot affix finished core assemblies, which may include finished connectors and therefore have irregular diameters that can vary over the length of the cord. As a result, existing techniques are generally only capable of embroidering unfinished cords (e.g., cords that do not have connectors on the ends). Thus, typically, the unfinished embroidered cords would be subject to subsequent crimping, soldering, and other mechanical processing steps for connecting the connectors to an embroidered wire.

Therefore, in order to reduce subsequent processing steps and equipment investment, the cord assembly placement frame attachment may enable an embroidery machine to place/affix a finished cord assembly (e.g., including one or more connectors) to/on set positions on a fabric. More specifically, the cord assembly placement frame attachment may place/stretch the finished cord assembly over the surface of a fabric in a controlled manner, after which the embroidery machine may create stitches over the finished cord assembly.

In operation, before, while, or after completing a standard stitching process, the embroidery machine may activate the cord assembly placement frame attachment to place a finished cord assembly. The cord assembly placement frame attachment may be mechatronically lowered onto the embroidered fabric that has been mounted to the embroidery frame of the embroidery table/pantograph.

The embroidery machine may include a feeder system to pull a finished cord assembly through the cord placing frame. The cord assembly placement frame attachment may introduce tension to the finished cord assembly by gripping the connectors. The completed cord assembly frame may then be lowered onto the surface of the fabric. The cord assembly placement frame attachment may tightly hold the finished cord assembly in position as the embroidery machine stitches over the top of the cord, fixing the cord to the fabric. In certain examples, the cord assembly placement frame attachment may include adjustable side clamps to accommodate additional cord sizes, lengths, and connectors for the desired cord assembly.

The cord assembly placement frame attachment may allow the embroidery machine to rapidly place embroidered cords, with connectors, into fabrics for various technical goods. Unlike in conventional approaches, the cord assembly placement frame attachment may permit the finished cord assemblies to include variable geometry features such as connectors. Embroidering cords with different-sized connectors may help realize additional functionalities of the textile. This cord assembly placement frame attachment may be used directly without additional soldering processes, cord connector attachment processes, or clamping processes for bare wires.

The cord assembly placement frame attachment may be used to embroider any suitable finished cord assembly. In one example, the cord assembly placement frame attachment may be used to stitch, onto a fabric, a USB cord that has been previously manufactured in a different process with connectors. This may enable an embroidery machine to embed finished cord assemblies (e.g., USB cords) to fabrics in various geometries and locations in the textile. Other examples of suitable finished cord assemblies that may be embroidered using the cord assembly placement frame attachment include Ethernet cords with connectors, D-sub cords with connectors, custom cords with connectors, etc.

Another attachment provided herein is an electronics pick-and-place attachment configured to embed flexible materials in smart textiles. These smart textiles may, for example, allow a user to obtain live feedback of the surrounding environment. The electronics pick-and-place attachment may enable an embroidery machine to manufacture these smart textiles in a highly automated way with limited equipment.

Traditional textile techniques (e.g., existing weaving, knitting, and embroidery processes) cannot adapt to specific electronic components of a circuit board on-demand and instead use pre-made circuit boards that have embedded components which are then placed as bulk objects in textiles. By contrast, the electronics pick-and-place attachment described herein may build customized electronics a flexible substrate on-demand during an embroidery process.

More specifically, the electronics pick-and-place attachment may position an electronics component on at least one component of a textile product and integrate the electronics component with the at least one component of the textile product. In one example, the electronics pick-and-place attachment may position an electronics component on solder (e.g., solder deposited by the welding attachment 210 (FIGS. 2 and 3)).

The electronics pick-and-place attachment may enable the embroidery machine to hold cartridges, reels, or pallets of standard package-sized electronics and deposit them with precision onto circuit boards on the embroidery machine. By depositing electronics such as resistors, capacitors, inductors, and integrated circuits onto the circuit board, the embroidery machine may build highly accurate/targeted electronics. These electronics may be customized according to the target embroidery design and any special characteristics of the flexible textile embroidery circuit.

In operation, the embroidery machine may switch from a stitching needle to the first or last attachment location that holds the electronics pick-and-place attachment. Upon reaching the position of the electronics pick-and-place attachment, the embroidery machine may turn on the electronics pick-and-place attachment and lower the electronics pick-and-place attachment toward the fabric. A distance sensor may measure the distance between the electronics pick-and-place attachment and the fabric. The embroidery machine may compensate for that distance according to the desired height levels. The embroidery frame of the embroidery machine, which may be guided by the pantograph, may align the electronics pick-and-place attachment with a desired location on the circuit board for which a new component is to be placed.

The electronics pick-and-place attachment may then deliver a small pad/dot of solder paste to the circuit board at the desired location. The electronics pick-and-place attachment may be preloaded with a cartridge reel of electronics components. The electronics pick-and-place attachment may eject a component from the cartridge reel and press a vacuum nozzle against the ejected component to lift the ejected component from the reel using suction. Once the electronics pick-and-place attachment has secured the ejected component within the vacuum gripper, the embroidery machine may move the embroidery frame in relation to the electronics pick-and-place attachment to place the ejected component onto the pad of solder.

In one example, a camera may capture visual feedback (e.g., a picture) to ensure that accuracy and placement of the electronic component is correct before the embroidery machine proceeds to further steps. The visual data may be manually or automatically analyzed to determine whether the placement is correct. If the placement is determined to be incorrect, the electronics pick-and-place attachment may lower back down to the circuit board, use the suction gripper to pick up the component, and re-adjust the component to compensating for any shift or rotation that was observed by the camera.

This process may be iterated for each electronic component (e.g., resistor) to be placed onto the circuit board that has been connected/stitched/placed on/to the fabric. After placing all the desired electronic components on the circuit board as described above, the electronics pick-and-place attachment may produce a hot cone of air to melt the solder and fuse the electronic component(s) to the circuit board. A controller module of the embroidery machine may send, to the electronics pick-and-place attachment, a signal to lift to the electronics pick-and-place attachment from the surface of the circuit board and fabric. The embroidery machine may continue the embroidery process, switching to an active embroidery needle and stitching with conductive or nonconductive thread.

A specific use case is provided as follows, though it will be appreciated that the electronics pick-and-place attachment may be used for any suitable application. In the use case, an embroidery machine uses conductive threads to construct a flexible textile circuit board. The conductive threads have variable resistances due to inconsistencies in the manufacturing process used to make them. The electronics pick-and-place attachment may enable the embroidery machine to tune the embroidered circuit after the embroidery is finished in order to properly mathematically integrate these variable resistances into the final textile circuit. More specifically, the electronics pick-and-place attachment allows the embroidery machine to place variable-resistance resistors to compensate for variations in the conductive thread, creating more accurate circuits. This accuracy may be critical for processing small signals, such as bio-signals. Optionally, the electronics pick-and-place attachment may image the variable-resistance resistors (e.g., using a camera) and correct for positional inconsistencies. The electronics pick-and-place attachment may attach the electronic components to the board using a cone of hot air to melt the solder and fuse the components.

Another attachment provided herein is an error detection attachment configured to proactively monitor the additive textile manufacturing machine to identify one or more potential future errors. In response to identifying the one or more potential future errors, the error detection attachment may generate a user alert.

In one example, the error detection attachment may provide feedback (e.g., statistical feedback) about an embroidery process. The feedback may include early error identification such as when an embroidery machine is about to run into a problem such as a broken thread or run out of material. The feedback may also include suggestions for tuning an embroidery machine to maximize performance, such as feedback for untrained embroidery machine operators regarding how to properly tension or set up an embroidery machine for a wide variety of different materials and substrates.

The error detection attachment may include an AI camera system attached to the front of the embroidery machine. The error detection attachment may include one or more cameras which are installed to face a needle box of embroidery needles, the fabric, thread tensioners, and/or the needle feed. The camera(s) may take statistical pictures, which may be provided to a computer that stores AI logic configured to aggregate the statistical pictures and compare the aggregated pictures to a picture library of known embroidery machine processes and tunings. The computer may be located on (e.g., integrated with) or remote from the error detection attachment.

To detect errors, the AI logic may first acquire large amounts of historical visual embroidery data and train based on the historical data. Once trained, the AI logic may predict errors proactively (e.g., before the errors occur). The AI logic may predict any suitable errors that the AI logic was trained to detect, such as thread breaks and incorrect tensions. The AI logic may provide the operator directions on how to correct the problem for future embroidery.

The cameras may determine whether there are upcoming problems in the embroidery process such as insufficient tension, too much tension, or insufficient thread quality. The AI logic may analyze pictures obtained from the cameras and provide data/feedback for the user regarding how to increase optimizations and mechanically-driven possibilities for the embroidery machine. The camera(s) may be installed at any suitable location(s) and face any suitable direction(s) that are appropriate for monitoring the embroidery machine at a close distance. In one example, for a clearer picture and high-speed camera settings, the cameras may be mounted above the embroidery machine using telephoto lenses to reduce vibrations caused by the embroidery process.

In one specific example, three cameras may be placed on the embroidery machine: a primary camera facing the fabric and where the needle is stitching into the fabric; a secondary camera facing the needle bar; and a tertiary camera facing the tensioners. The first camera may indicate how the embroidery has performed via the fabric by observing quality and other defects in the fabric. The secondary camera may examine the thread tension in the embroidery machine. The thread tension may be controlled by multiple tension knobs, thread take-up levers, and springs, and may impact the quality and output of the embroidery machine. The tertiary camera may enable the tension to be optically be determined. In one example, a fourth camera may also be provided which is placed underneath the embroidery machine and faces the bobbin to determine the underlying embroidery tensions of the bobbin and how they relate to the top thread. While tuning thread tensions typically involve a highly skilled operator with years of experience in embroidery, the error detection attachment may enable lower-skilled operators to properly tune embroidery machines.

In operation, the embroidery machine may begin an embroidery process, creating stitches using the embroidery machine needle and thread. While stitches are being made by the embroidery machine, the cameras may regularly image the resulting structure in the fabric, the thread, the thread tensioning system (e.g., the thread tensioners), and any other suitable components. The cameras may send the images to the computer that stores AI logic configured to analyze the images and proactively detect possible upcoming errors.

If the AI logic detects an error, the embroidery machine may automatically stop and the cameras may take a picture of the resulting textile structure. The AI logic may also take a buffer reading from twenty seconds of previous footage. This footage may be labeled in software as a machine break may be analyzed and added to a database of visual data.

The error detection attachment may help an operator tune an embroidery machine for the first time. Typically, differences can arise due to the specific threads and materials used in an embroidery machine. These differences must be rectified by the operator before high-quality embroidery can commence. The error detection attachment may help the operator arrive at and maintain these optimizations. For example, the error detection attachment may ensure that the top thread matches the bottom thread that both of those threads match the material selection of the thread as well as the embroidered substrate material or fabric. The error detection attachment may help balance many variables in order to obtain an optimal embroidery process that runs without breaking threads, ensuring that the embroidery machine continues running and reducing unnecessary machine downtime.

Figure 18:
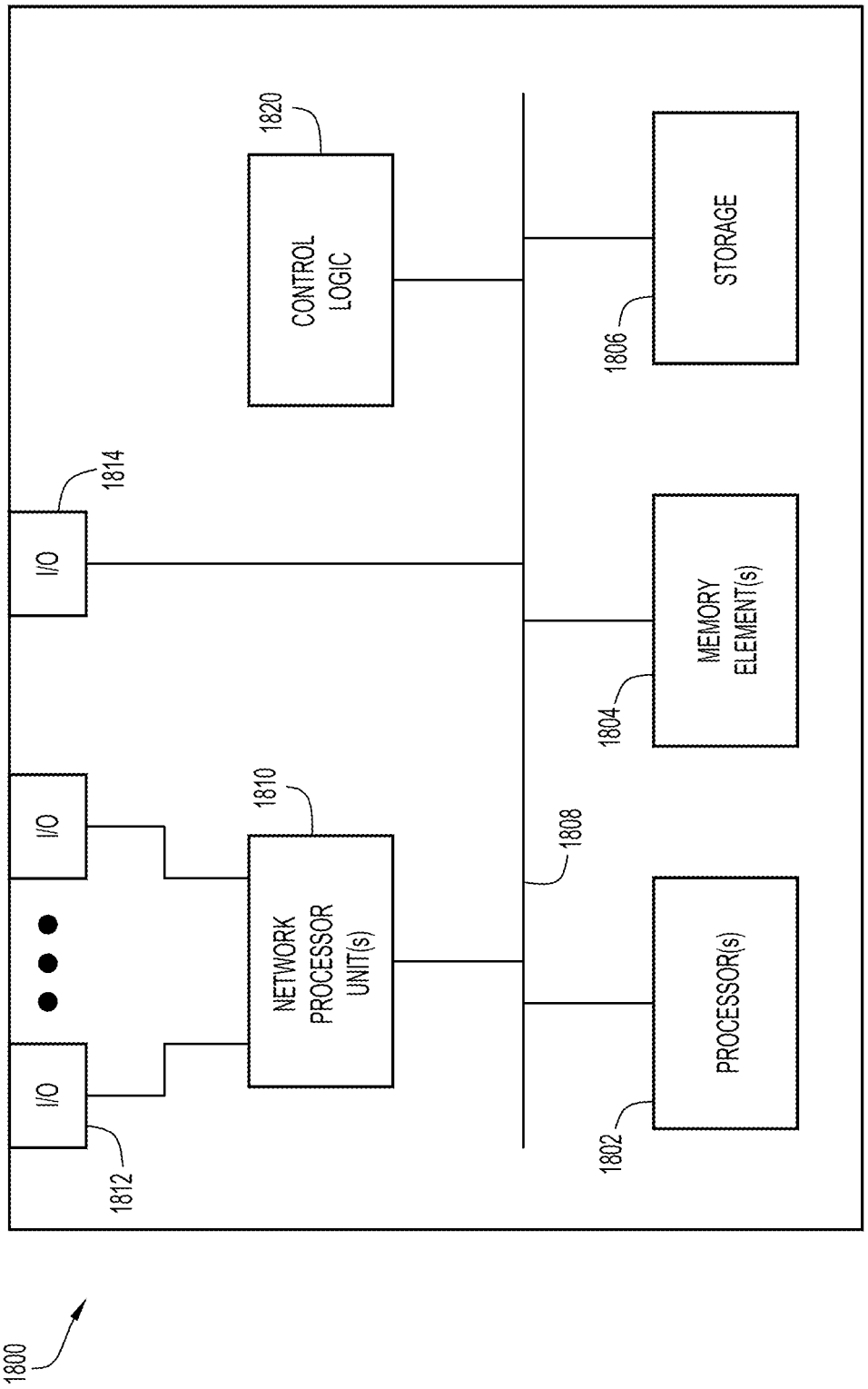
FIG. 18 illustrates a hardware block diagram of a computing device configured to perform functions associated with operations discussed herein, according to an example embodiment.

Referring to FIG. 18, FIG. 18 illustrates a hardware block diagram of a computing device 1800 that may perform functions associated with operations discussed herein in connection with the techniques depicted in FIG. 1-17. In various embodiments, a computing device, such as computing device 1800 or any combination of computing devices 1800, may be configured as any entity/entities as discussed for the techniques depicted in connection with FIGS. 1-17 in order to perform operations of the various techniques discussed herein.

In at least one embodiment, computing device 1800 may include one or more processor(s) 1802, one or more memory element(s) 1804, storage 1806, a bus 1808, one or more network processor unit(s) 1810 interconnected with one or more network input/output (I/O) interface(s) 1812, one or more I/O interface(s) 1814, and control logic 1820. In various embodiments, instructions associated with logic for computing device 1800 can overlap in any manner and are not limited to the specific allocation of instructions and/or operations described herein.

In at least one embodiment, processor(s) 1802 is/are at least one hardware processor configured to execute various tasks, operations and/or functions for computing device 1800 as described herein according to software and/or instructions configured for computing device 1800. Processor(s) 1802 (e.g., a hardware processor) can execute any type of instructions associated with data to achieve the operations detailed herein. In one example, processor(s) 1802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1804 and/or storage 1806 is/are configured to store data, information, software, and/or instructions associated with computing device 1800, and/or logic configured for memory element(s) 1804 and/or storage 1806. For example, any logic described herein (e.g., control logic 1820) can, in various embodiments, be stored for computing device 1800 using any combination of memory element(s) 1804 and/or storage 1806. Note that in some embodiments, storage 1806 can be consolidated with memory elements 1804 (or vice versa), or can overlap/exist in any other suitable manner.

In at least one embodiment, bus 1808 can be configured as an interface that enables one or more elements of computing device 1800 to communicate in order to exchange information and/or data. Bus 1808 can be implemented with any architecture designed for passing control, data and/or information between processors, memory elements/storage, peripheral devices, and/or any other hardware and/or software components that may be configured for computing device 1800. In at least one embodiment, bus 1808 may be implemented as a fast kernel-hosted interconnect, potentially using shared memory between processes (e.g., logic), which can enable efficient communication paths between the processes.

In various embodiments, network processor unit(s) 1810 may enable communication between computing device 1800 and other systems, entities, etc., via network I/O interface(s) 1812 to facilitate operations discussed for various embodiments described herein. In various embodiments, network processor unit(s) 1810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1800 and other systems, entities, etc. to facilitate operations for various embodiments described herein. In various embodiments, network I/O interface(s) 1812 can be configured as one or more Ethernet port(s), Fibre Channel ports, and/or any other I/O port(s) now known or hereafter developed. Thus, the network processor unit(s) 1810 and/or network I/O interfaces 1812 may include suitable interfaces for receiving, transmitting, and/or otherwise communicating data and/or information in a network environment.

I/O interface(s) 1814 allow for input and output of data and/or information with other entities that may be connected to computing device 1800. For example, I/O interface(s) 1814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1820 can include instructions that, when executed, cause processor(s) 1802 to perform operations, which can include, but not be limited to, providing overall control operations of computing device 1800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1804 and/or storage 1806 can store data, software, code, instructions (e.g., processor instructions), logic, parameters, combinations thereof, and/or the like used for operations described herein. This includes memory elements 1804 and/or storage 1806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1800 for transfer onto another computer readable storage medium.

To the extent that embodiments presented herein relate to the storage of data, the embodiments may employ any number of any databases, data stores or storage structures (e.g., files, databases, data structures, data or other repositories, etc.) to store information.

Figure 19:
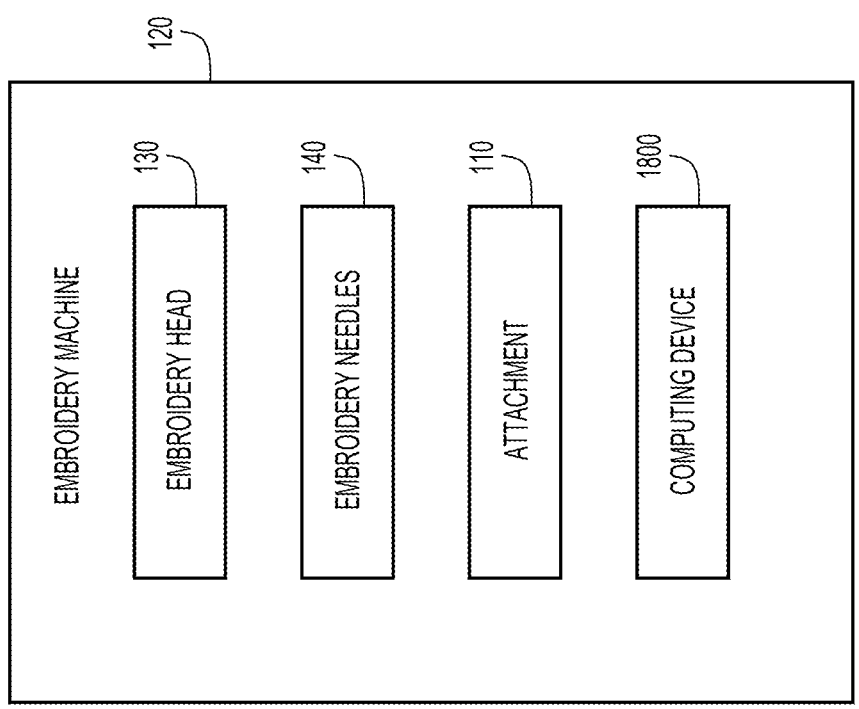
FIG. 19 illustrates a block diagram of an embroidery machine configured to perform operations described herein, according to an example embodiment.

FIG. 19 illustrates a block diagram of the embroidery machine 120 configured to perform operations described herein, according to an example embodiment. The embroidery machine 120 includes the embroidery head 130, one or more embroidery needles 140, and the attachment 110. The embroidery machine 120 also includes computing device 1800 (FIG. 18). Computing device 1800 may cause the embroidery machine 120 to perform one or more operations described herein using the embroidery head 130, embroidery needles 140, and attachment 110. While computing device 1800 is shown in the embroidery machine 120, depending on the specific attachment(s) and/or application, in other examples various components of computing device 1800 (e.g., control logic 1820 or a portion thereof) may be external to the embroidery machine 120 (e.g., on a computer).

The specific operations performed by computing device 1800 may vary depending on the type of the attachment 110 that is installed on the embroidery machine 120. The attachment 110 may be any suitable attachment, such as a welding attachment (FIGS. 2 and 3); a 3D printing attachment (FIGS.

4-6); a paste dispensing attachment (FIGS. 7 and 8); an ink applicator attachment (FIGS. 9 and 10); an ultrasonic head attachment (FIGS. 11 and 12); a relocation attachment (FIGS. 13 and 14); a camera-assisted circuit board stitching attachments (FIG. 15); a cutting attachment (e.g., a pneumatic cutting attachment as depicted in FIGS. 16 and 17); a cord assembly placement frame attachment; an electronics pick-and-place attachment; or an error detection attachment.

While FIG. 19 illustrates a block diagram of the embroidery machine 120, it will be appreciated that the techniques described herein may be compatible with any suitable additive textile manufacturing machine (e.g., weaving machine, knitting machine, etc.). Thus, attachments described herein may be integrated with any suitable additive textile manufacturing machine. Furthermore, while specific examples of attachments are provided herein, it will be appreciated that the techniques described herein may be compatible with any suitable attachments, variations of attachments, or combinations of attachments described herein.

Figure 20:
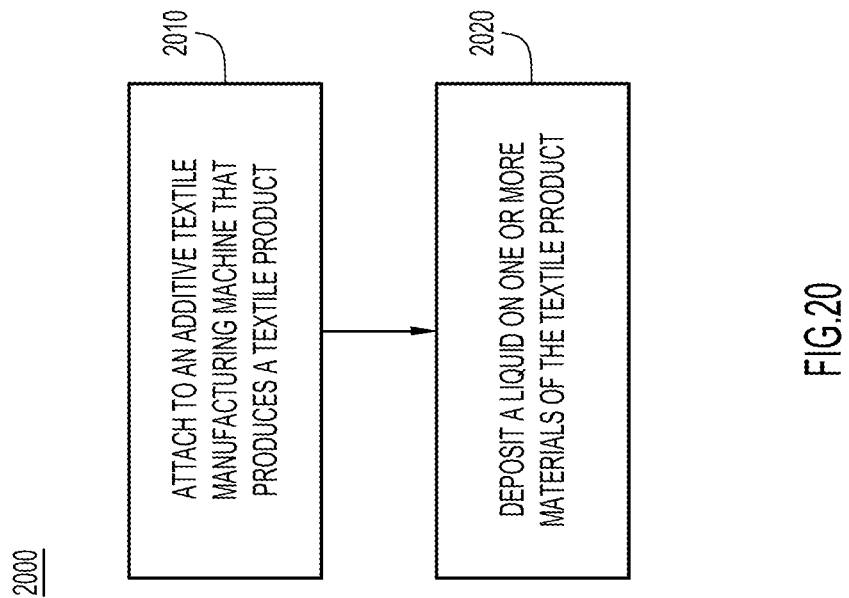
FIG. 20 illustrates a flowchart of a method for performing functions associated with operations discussed herein, according to an example embodiment.

FIG. 20 is a flowchart of an example method 2000 for performing functions associated with operations discussed herein. Method 2000 may be performed by any suitable entity, such as an attachment (e.g., welding attachment, 3D printing attachment, adhesive dispensing attachment, ink applicator attachment, etc.). At operation 2010, the attachment attaches to an additive textile manufacturing machine that produces a textile product. At operation 2020, the attachment deposits a liquid on one or more materials of the textile product.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Each example embodiment disclosed herein has been included to present one or more different features. This disclosure explicitly envisions compound embodiments that combine multiple previously-discussed features in different example embodiments into a single system or method. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, an apparatus is provided. The apparatus comprises: a connector component configured to attach to an additive textile manufacturing machine that produces a textile product; and a liquid deposition component configured to deposit a liquid on one or more materials of the textile product.

In one example, the liquid deposition component is configured to deposit solder on the one or more materials of the textile product.

In one example, the liquid deposition component is configured to deposit a 3D printing material on the one or more materials of the textile product.

In one example, the liquid deposition component is configured to deposit adhesive on the one or more materials of the textile product.

In one example, the liquid deposition component is configured to deposit ink on the one or more materials of the textile product.

In another form, a method is provided. The method comprises: attaching to an additive textile manufacturing machine that produces a textile product; and depositing a liquid on one or more materials of the textile product.

In one example, depositing the liquid on the one or more materials of the textile product includes: depositing solder on the one or more materials of the textile product.

In one example, the method further comprises: inspecting the solder with an imaging device; and based on inspecting the solder, depositing additional solder on the one or more materials of the textile product.

In one example, the method further comprises: positioning an electronics component on the solder.

In one example, depositing the liquid on the one or more materials of the textile product includes: depositing a 3D printing material on the one or more materials of the textile product.

In one example, depositing the liquid on the one or more materials of the textile product includes: depositing paste on the one or more materials of the textile product.

In one example, depositing the liquid on the one or more materials of the textile product includes: depositing ink on the one or more materials of the textile product.

In another form, a system is provided. The system comprises: an additive textile manufacturing machine that produces a textile product; and a first additive textile manufacturing machine attachment configured to: connect to the additive textile manufacturing machine; and deposit a liquid on one or more materials of the textile product.

In one example, the system further comprises: a second additive textile manufacturing machine attachment configured to: connect to the additive textile manufacturing machine; using an imaging device, detect a positioning of a circuit board relative to at least one component of the textile product; and in response to detecting the positioning of the circuit board, integrate the circuit board with the at least one component of the textile product.

In one example, the system further comprises: a second additive textile manufacturing machine attachment configured to: connect to the additive textile manufacturing machine; position an electronics component on at least one component of the textile product; and integrate the electronics component with the at least one component of the textile product.

In one example, the system further comprises: a second additive textile manufacturing machine attachment configured to: connect to the additive textile manufacturing machine; and emit ultrasonic waves toward at least one component of the textile product.

In one example, the system further comprises: a second additive textile manufacturing machine attachment configured to: connect to the additive textile manufacturing machine; and relocate at least one component or by-product of the textile product in relation to the additive textile manufacturing machine.

In one example, the system further comprises: a second additive textile manufacturing machine attachment configured to: connect to the additive textile manufacturing machine; and cut at least one component or by-product of the textile product using a blade In one example, the system further comprises: a second additive textile manufacturing machine attachment configured to: connect to the additive textile manufacturing machine; and integrate a cord assembly with at least one component of the textile product.

In one example, the system further comprises: a second additive textile manufacturing machine attachment configured to: connect to the additive textile manufacturing machine; proactively monitor the additive textile manufacturing machine to identify one or more potential future errors; and in response to identifying the one or more potential future errors, generate a user alert.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only.

What is claimed is:

1. A method comprising:
    attaching a 3D printing attachment to a mechanical connector extending from a needle bar box of an embroidery head of an embroidery machine to mechanically fix the 3D printing attachment to the embroidery head, wherein the needle bar box holds an embroidery needle of the embroidery head such that mechanically fixing the 3D printing attachment to the embroidery head maintains a spatial alignment between the embroidery needle and the 3D printing attachment, and the embroidery machine comprises a frame and a pantograph connected to the frame, the frame and the pantograph being configured to move relative to the embroidery head and the 3D printing attachment mechanically fixed to the embroidery head;
    outputting, via the embroidery head, a textile material to embroider a textile product secured to the frame with the embroidery needle;
    depositing, via the 3D printing attachment mechanically fixed to the embroidery head, a 3D printing material on the textile product secured to the frame; and
    moving the pantograph continuously along multiple axes relative to the embroidery head and the 3D printing attachment during embroidery and deposition operations to distribute the 3D printing material in registration with at least a portion of the textile material output by the embroidery head.

2. The method of claim 1, wherein outputting the textile material creates an embroidered design, and the method further comprises:
    using an imaging device to detect a positioning of holes of a circuit board relative to the textile product; and
    outputting, via the embroidery head, the textile material based on the positioning of the holes of the circuit board to align the embroidered design with the circuit board.

3. The method of claim 1, comprising:
    positioning an electronics component on at least one component of the textile product; and
    integrating the electronics component with the at least one component of the textile product.

4. The method of claim 1, comprising emitting ultrasonic waves toward at least one component of the textile product to fuse different portions of the textile product to one another.

5. The method of claim 1, comprising:
    cutting a portion of the textile product; and
    relocating the portion of the textile product while a remainder of the textile product is secured to the frame.

6. The method of claim 1, comprising integrating a cord assembly with at least one component of the textile product.

7. The method of claim 1, comprising outputting additional textile material onto the textile product after the 3D printing material is deposited onto the textile product to shield the 3D printing material via the additional textile material.

8. The method of claim 1, wherein the 3D printing attachment comprises:
    a bracket configured to attach to the mechanical connector of the embroidery head and extend away from the embroidery head while attached to the mechanical connector;
    a 3D printing material source coupled to the bracket; and
    a motor,
    wherein depositing the 3D printing material via the 3D printing attachment comprises pulling the 3D printing material from the 3D printing material source toward the textile product via the motor.

9. The method of claim 8, wherein the 3D printing attachment comprises an extruder tip, and depositing the 3D printing material via the 3D printing attachment comprises:
- directing the 3D printing material through the extruder tip;
- melting the 3D printing material via the extruder tip to provide a liquified 3D printing material; and
- depositing the liquified 3D printing material on the textile product.

10. The method of claim 1, wherein attaching the 3D printing attachment to the mechanical connector of the embroidery head comprises inserting a mechanical fastener through the 3D printing attachment and the mechanical connector to mechanically fix the 3D printing attachment to the embroidery head.

11. The method of claim 1, wherein depositing the 3D printing material on the textile product comprises encapsulating a shape memory alloy via the 3D printing material to disperse heat of the shape memory alloy.

12. The method of claim 1, wherein depositing the 3D printing material on the textile product comprises increasing a stiffness of a region of the textile product having an electronic component.

13. The method of claim 1, wherein depositing the 3D printing material on the textile product comprises encapsulating and coating the textile material output via the embroidery head with the 3D printing material.

14. The method of claim 1, wherein the 3D printing material comprises a filament, a thermoplastic material, a liquid, or any combination thereof.

15. A method comprising:
- outputting, via an embroidery head of an embroidery machine, a textile material to embroider a textile product secured to a frame via an embroidery needle of the embroidery head;
- depositing, via a 3D printing attachment, a 3D printing material on the textile product secured to the frame, wherein the 3D printing attachment is attached to a mechanical connector extending from a needle bar box of the embroidery head to mechanically fix the 3D printing attachment to the embroidery head, the needle bar box holding the embroidery needle such that mechanically fixing the 3D printing attachment to the embroidery head maintains a spatial alignment between the embroidery needle and the 3D printing attachment; and
- moving a pantograph of the embroidery machine continuously along multiple axes relative to the embroidery head and the 3D printing attachment during embroidery and deposition operations to distribute the 3D printing material in registration with at least a portion of the textile material output by the embroidery head.

16. A method comprising:
- attaching a 3D printing attachment to a mechanical connector extending from a needle bar box of an embroidery head of an embroidery machine to mechanically fix the 3D printing attachment to the embroidery head, wherein the needle bar box holds an embroidery needle of the embroidery machine such that mechanically fixing the 3D printing attachment to the embroidery head maintains a spatial alignment between the embroidery needle and the 3D printing attachment, and the embroidery machine comprises a frame and a pantograph connected to the frame, the frame and the pantograph being configured to move relative to the embroidery head and the 3D printing attachment mechanically fixed to the embroidery head;
- depositing, via the 3D printing attachment mechanically fixed to the embroidery head, a 3D printing material on a textile product secured to the frame; and
- moving the pantograph continuously along multiple axes relative to the embroidery head and the 3D printing attachment during embroidery and deposition operations to distribute the 3D printing material in registration with at least a portion of textile material output by the embroidery head to the textile product.

17. The method of claim 1, wherein the 3D printing attachment comprises a bracket and an extruder tip configured to deposit the 3D printing material on the textile product, and attaching the 3D printing attachment to the mechanical connector comprises attaching the bracket to the mechanical connector to position the extruder tip in front of the embroidery needle over the frame and the pantograph.

18. The method of claim 17, wherein the mechanical connector extends from the needle bar box along a first axis, the 3D printing attachment comprises a control track extending from the mechanical connector along a second axis, transverse to the first axis, while the 3D printing attachment is attached to the mechanical connector, and the extruder tip is positioned adjacent to the control track along the first axis such that the extruder tip is positioned in front of the embroidery needle over the frame and the pantograph while the 3D printing attachment is attached to the mechanical connector.

19. The method of claim 18, wherein the mechanical connector extends from the needle bar box along the first axis in a first direction, and the extruder tip is positioned adjacent to the control track along the first axis in a second direction, opposite the first direction, such that the extruder tip is positioned in front of the embroidery needle over the frame and the pantograph while the 3D printing attachment is attached to the mechanical connector.

20. The method of claim 1, comprising controlling the embroidery head and the 3D printing attachment with a single controller module to synchronize embroidery and deposition operations.

* * * * *